United States Patent
Wu et al.

(10) Patent No.: US 10,158,404 B2
(45) Date of Patent: Dec. 18, 2018

(54) DATA TRANSMISSION METHOD, TRANSMIT END DEVICE, AND RECEIVE END DEVICE

(71) Applicant: Huawei Technologies Co., Ltd., Shenzhen (CN)

(72) Inventors: Yiqun Wu, Shanghai (CN); Shunqing Zhang, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/618,661

(22) Filed: Jun. 9, 2017

(65) Prior Publication Data

US 2017/0338869 A1 Nov. 23, 2017

Related U.S. Application Data

(63) Continuation of application No. PCT/CN2014/093539, filed on Dec. 11, 2014.

(51) Int. Cl.
*H04B 7/0456* (2017.01)
*H04L 1/06* (2006.01)
(Continued)

(52) U.S. Cl.
CPC .......... *H04B 7/0456* (2013.01); *H04L 1/06* (2013.01); *H04L 5/0016* (2013.01); *H04L 7/065* (2013.01);
(Continued)

(58) Field of Classification Search
USPC .................................. 375/295; 370/328, 329
See application file for complete search history.

(56) References Cited

U.S. PATENT DOCUMENTS

| 2005/0249306 A1 | 11/2005 | Chae et al. |
| 2007/0189151 A1 | 8/2007 | Pan et al. |
| (Continued) | | |

FOREIGN PATENT DOCUMENTS

| CN | 101841397 A | 9/2010 |
| CN | 102130755 A | 7/2011 |
| (Continued) | | |

OTHER PUBLICATIONS

Handte, T. et al., "BER Analysis and optimization of Generalized Spatial Modulation in Correlated Fading Channel", Vehicular Technology Conference Fall(VTC 2009—Fall), 2009 IEEE 70th, IEEE, USA, Sep. 20, 2009, XP031600057, 5 pages, Piscataway, NJ.
(Continued)

*Primary Examiner* — Eva Puente
(74) *Attorney, Agent, or Firm* — Slater Matsil, LLP

(57) ABSTRACT

The present disclosure discloses a data transmission method, a transmit end device, and a receive end device. The method includes performing bit mapping processing on a first part of bits of a first data bit group, to generate a first modulation symbol and determining a first precoding matrix from multiple preset precoding matrices according to a second part of bits of the first data bit group. The method also includes performing precoding processing on the first modulation symbol according to the first precoding matrix, to obtain a first modulation symbol matrix and transmitting the first modulation symbol matrix to a receive end device by using at least two antennas.

18 Claims, 10 Drawing Sheets

(51) Int. Cl.
*H04L 27/34* (2006.01)
*H04L 5/00* (2006.01)
*H04L 7/06* (2006.01)
*H04L 25/03* (2006.01)

(52) U.S. Cl.
CPC ........ *H04L 25/03942* (2013.01); *H04L 27/34* (2013.01)

(56) References Cited

U.S. PATENT DOCUMENTS

| | | | |
|---|---|---|---|
| 2008/0037673 | A1 | 2/2008 | Ahn et al. |
| 2013/0058390 | A1 | 3/2013 | Haas et al. |
| 2013/0294542 | A1* | 11/2013 | Zhang .................. H04L 1/0606 375/295 |
| 2014/0169408 | A1 | 6/2014 | Bayesteh et al. |
| 2014/0204841 | A1* | 7/2014 | Ruiz Delgado ...... H04B 7/0689 370/328 |
| 2016/0112104 | A1* | 4/2016 | Jongren ............... H04B 7/0617 370/329 |
| 2016/0233983 | A1* | 8/2016 | Jeong ................. H03M 13/1102 |
| 2016/0352400 | A1* | 12/2016 | Chae ................... H04B 7/0456 |

FOREIGN PATENT DOCUMENTS

| | | |
|---|---|---|
| CN | 102594522 A | 7/2012 |
| RU | 2341021 C2 | 12/2008 |
| RU | 2407177 C2 | 12/2010 |
| WO | 2011104502 A2 | 9/2011 |
| WO | 2014075637 A1 | 5/2014 |

OTHER PUBLICATIONS

Nikopour, H. et al., "SCMA for downlink multiple access of 5G wireless networks", Jan. 1, 2014, Global Communications Conference (GLOBECOM), IEEE,XP002769939, 6 pages.

"3rd Generation Partnership Project; Technical Specification Group Radio Access Network; Evolved Universal Terrestrial Radio Access(E-UTRA); Physical channels and modulation(Release 11)", 3GPP Standard; 3GPP TS 36.211, 3rd generation partnership project(3GPP), Mobile Competence Centre; vol. RAN WG1, No. V11.6.0, Sep. 23, 2014, XP050925877, 120 pages.

* cited by examiner

300

Receive a first modulation symbol matrix transmitted by a transmit end device, where the first modulation symbol matrix is generated by the transmit end device after the transmit end device performs precoding processing on a first modulation symbol according to a first precoding matrix of multiple preset precoding matrices, the first modulation symbol is generated by the transmit end device after the transmit end device performs bit mapping processing on a first portion of bits of a first data bit group, the first precoding matrix is corresponding to a second portion of bits of the first data bit group, and the first precoding matrix is corresponding to at least two antennas of N antennas included by the transmit device, the first data bit group includes at least two bits, the first portion of bits includes at least one bit, and the second portion of bits is a bit of the first data bit group other than the first portion of bits ～ S310

Perform, according to the first modulation symbol matrix, channel estimation on a channel corresponding to each precoding matrix, to determine the first data bit group ～ S320

FIG. 12

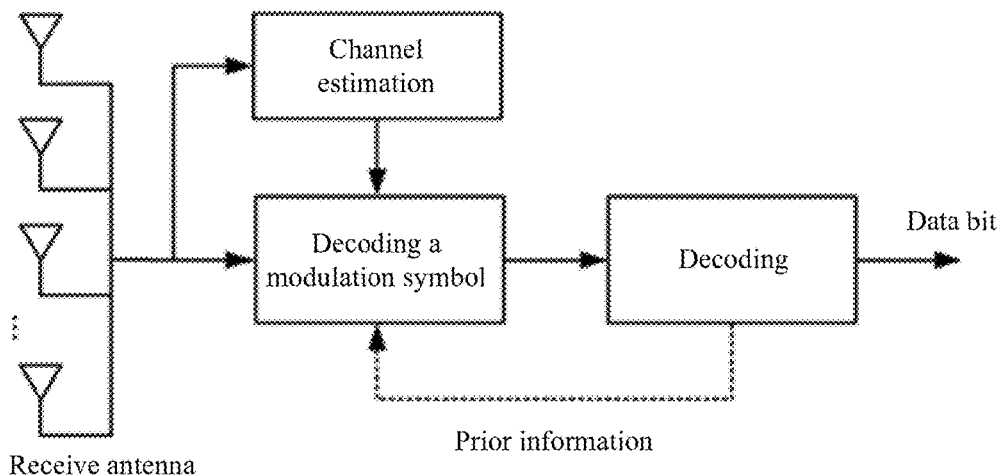

FIG. 13

DATA TRANSMISSION METHOD, TRANSMIT END DEVICE, AND RECEIVE END DEVICE

CROSS-REFERENCE TO RELATED APPLICATIONS

This application is a continuation of International Patent Application No. PCT/CN2014/093539, filed on Dec. 11, 2014, the disclosure of which is hereby incorporated by reference in its entirety.

TECHNICAL FIELD

The present embodiments relates to the communications field, and in particular, to a data transmission method, a transmit end device, and a receive end device in the communications field.

BACKGROUND

With the rapid development of Internet technologies and applications and the rapid growth of Internet users, a communications system has an increasingly high requirement on data transmission performance. A multiple-antenna transmission policy is mostly used at present to obtain better bit error rate performance and a higher data transmission rate. During multiple-antenna transmission, a spatial modulation (SM) technology is most widely applied.

The spatial modulation technology uses a multiple-antenna structure in a manner of mapping some data bits to quadrature amplitude modulation (QAM) symbols and mapping the other data bits to transmit antenna serial numbers. For example, when to-be-transmitted data bits are 010, 0 corresponds to a first transmit antenna, and 10 corresponds to a modulation symbol 1−i; and when to-be-transmitted bits are 111, 1 corresponds to a second transmit antenna, and 11 corresponds to a modulation symbol −1−i. In this way, the modulation symbol 1−i is transmitted by using the first transmit antenna, and the modulation symbol −1−i is transmitted by using the second transmit antenna. In comparison with other multiple-antenna transmission schemes, the spatial modulation technology features simpler transmitter processing and low decoding complexity of a receiver, and does not require antennas to strictly synchronize with each other, and therefore has better performance in a particular channel condition.

However, in an existing spatial modulation technology, a group of data bits are transmitted by using one antenna after being mapped to modulation symbols, and when a transmit antenna selected according to an antenna serial number is right in deep fading, transmission interruption is caused. Therefore, transmission reliability of the existing spatial modulation technology is low.

SUMMARY

Embodiments of the present invention provide a data transmission method, a transmit end device, and a receive end device, to resolve a problem of low transmission reliability in spatial modulation.

According to a first aspect, a data transmission method is provided, where the method is executed by a transmit end device, the transmit end device includes N antennas, and N≥2. The method includes performing bit mapping processing on a first part of bits of a first data bit group, to generate a first modulation symbol, where the first data bit group includes at least two bits, and the first part of bits includes at least one bit and determining a first precoding matrix from multiple preset precoding matrices according to a second part of bits of the first data bit group, where the first precoding matrix is corresponding to at least two antennas of the N antennas, and the second part of bits is a bit of the first data bit group other than the first part of bits; performing precoding processing on the first modulation symbol according to the first precoding matrix, to obtain a first modulation symbol matrix. Additionally, the method includes transmitting the first modulation symbol matrix to a receive end device by using the at least two antennas.

With reference to the first aspect, in a first possible implementation of the first aspect, the first precoding matrix includes R rows and C columns, where R is corresponding to a quantity of the at least two antennas, and C is corresponding to a quantity of non-zero symbols of the first modulation symbol.

With reference to the first aspect or the first possible implementation of the first aspect, in a second possible implementation of the first aspect, the transmitting the first modulation symbol matrix to a receive end device by using the at least two antennas includes: performing superimposition processing on the first modulation symbol matrix and at least one second modulation symbol matrix, where the second modulation symbol matrix is generated after precoding processing is performed on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, and the second precoding matrix is corresponding to at least two antennas of the N antennas; and transmitting the first modulation symbol matrix obtained after the superimposition processing to the receive end device by using the at least two antennas.

With reference to the second possible implementation of the first aspect, in a third possible implementation of the first aspect, a quantity of rows in the first modulation symbol matrix and a quantity of rows in the second modulation symbol matrix are equal, and a quantity of columns in the first modulation symbol matrix and a quantity of columns in the second modulation symbol matrix are equal.

With reference to any one of the first aspect or the first to the third possible implementations of the first aspect, in a fourth possible implementation of the first aspect, an element of the precoding matrix is 0 or 1.

With reference to any one of the first aspect or the first to the fourth possible implementations of the first aspect, in a fifth possible implementation of the first aspect, the bit mapping processing is to map bits by using a code word, the code word is a multidimensional complex number vector and is used to represent a mapping relationship between bits and at least two modulation symbols, and the at least two modulation symbols include at least one non-zero modulation symbol and at least one zero modulation symbol.

With reference to any one of the first aspect or the first to the fifth possible implementations of the first aspect, in a sixth possible implementation of the first aspect, the first modulation symbol includes at least one non-zero modulation symbol and at least one zero modulation symbol.

With reference to the second or the third possible implementation of the first aspect, in a seventh possible implementation of the first aspect, the second modulation symbol includes at least one non-zero modulation symbol and at least one zero modulation symbol.

With reference to any one of the first aspect or the first to the seventh possible implementations of the first aspect, in an eighth possible implementation of the first aspect, the transmit end device is a network device; or the transmit end device is a terminal device.

According to a second aspect, a data transmission method is provided, where the method is executed by a receive end device, including receiving a first modulation symbol matrix transmitted by a transmit end device, where the first modulation symbol matrix is generated by the transmit end device after the transmit end device performs precoding processing on a first modulation symbol according to a first precoding matrix of multiple preset precoding matrices, the first modulation symbol is generated by the transmit end device after the transmit end device performs bit mapping processing on a first part of bits of a first data bit group, the first precoding matrix is corresponding to a second part of bits of the first data bit group, and the first precoding matrix is corresponding to at least two antennas of N antennas included by the transmit end device, the first data bit group includes at least two bits, the first part of bits includes at least one bit, and the second part of bits is a bit of the first data bit group other than the first part of bits. The method also includes performing, according to the first modulation symbol matrix, channel estimation on a channel corresponding to each precoding matrix, to determine the first data bit group.

With reference to the second aspect, in a first possible implementation of the second aspect, the performing, according to the first modulation symbol matrix, channel estimation on a channel corresponding to each precoding matrix, to determine the first data bit group includes: performing, according to the first modulation symbol matrix, channel estimation on the channel corresponding to each precoding matrix, to determine channel gains of channels corresponding to the multiple precoding matrices; decoding the first modulation symbol matrix according to the channel gains, to obtain log-likelihood values corresponding to all combinations of modulation symbols and precoding matrices; and decoding a combination, whose log-likelihood value is the largest, of a modulation symbol and a precoding matrix, to determine the first data bit group.

With reference to the first possible implementation of the second aspect, in a second possible implementation of the second aspect, before the decoding a combination, whose log-likelihood value is the largest, of a modulation symbol and a precoding matrix, to determine the first data bit group, the method further includes: obtaining prior information of the first data bit group; and the decoding a combination, whose log-likelihood value is the largest, of a modulation symbol and a precoding matrix, to determine the first data bit group includes: decoding, according to the prior information, the combination, whose log-likelihood value is the largest, of a modulation symbol and a precoding matrix, to determine the first data bit group.

With reference to any one of the second aspect or the first or the second possible implementation of the second aspect, in a third possible implementation of the second aspect, the method further includes: receiving at least one second modulation symbol matrix transmitted by the transmit end device, where the second modulation symbol matrix is generated by the transmit end device after the transmit end device performs precoding processing on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, the second precoding matrix is corresponding to at least two antennas of the N antennas included by the transmit end device, and superimposition processing is performed on the first modulation symbol matrix and the at least one second modulation symbol matrix by the transmit end device; and the performing, according to the first modulation symbol matrix, channel estimation on a channel corresponding to each precoding matrix, to determine the first data bit group includes: performing, according to the first modulation symbol matrix and the at least one second modulation symbol matrix, channel estimation on the channel corresponding to each precoding matrix, to determine the first data bit group and at least one second data bit group.

With reference to any one of the second aspect or the first to the third possible implementations of the second aspect, in a fourth possible implementation of the second aspect, the bit mapping processing is to map bits by using a code word, the code word is a multidimensional complex number vector and is used to represent a mapping relationship between bits and at least two modulation symbols, and the at least two modulation symbols include at least one non-zero modulation symbol and at least one zero modulation symbol.

With reference to any one of the second aspect or the first to the fourth possible implementations of the second aspect, in a fifth possible implementation of the second aspect, the first modulation symbol includes at least one non-zero modulation symbol and at least one zero modulation symbol.

With reference to the third possible implementation of the second aspect, in a sixth possible implementation of the second aspect, the second modulation symbol includes at least one non-zero modulation symbol and at least one zero modulation symbol.

With reference to any one of the second aspect or the first to the sixth possible implementations of the second aspect, in a seventh possible implementation of the second aspect, the receive end device is a network device; or the receive end device is a terminal device.

According to a third aspect, a transmit end device is provided, where the transmit end device includes N antennas, and N≥2; and the transmit end device includes: a mapping module, configured to perform bit mapping processing on a first part of bits of a first data bit group, to generate a first modulation symbol, where the first data bit group includes at least two bits, and the first part of bits includes at least one bit; a first determining module, configured to determine a first precoding matrix from multiple preset precoding matrices according to a second part of bits of the first data bit group, where the first precoding matrix is corresponding to at least two antennas of the N antennas, and the second part of bits is a bit of the first data bit group other than the first part of bits; a precoding module, configured to perform, according to the first precoding matrix determined by the first determining module, precoding processing on the first modulation symbol obtained by the mapping module, to obtain a first modulation symbol matrix; and a transmission module, configured to transmit, to a receive end device by using the at least two antennas, the first modulation symbol matrix obtained after the precoding module performs precoding processing.

With reference to the third aspect, in a first possible implementation of the third aspect, the first precoding matrix includes R rows and C columns, where R is corresponding to a quantity of the at least two antennas, and C is corresponding to a quantity of non-zero symbols of the first modulation symbol.

With reference to the third aspect or the first possible implementation of the third aspect, in a second possible implementation of the third aspect, the transmission module is specifically configured to: perform superimposition processing on the first modulation symbol matrix and at least one second modulation symbol matrix, where the second modulation symbol matrix is generated after precoding processing is performed on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, and the second precoding matrix is corresponding to at least two antennas of the N antennas; and transmit the first modulation symbol matrix obtained after the superimposition processing to the receive end device by using the at least two antennas.

With reference to the second possible implementation of the third aspect, in a third possible implementation of the third aspect, a quantity of rows in the first modulation symbol matrix and a quantity of rows in the second modulation symbol matrix are equal, and a quantity of columns in the first modulation symbol matrix and a quantity of columns in the second modulation symbol matrix are equal.

With reference to any one of the third aspect or the first to the third possible implementations of the third aspect, in a fourth possible implementation of the third aspect, an element of the precoding matrix is 0 or 1.

With reference to any one of the third aspect or the first to the fourth possible implementations of the third aspect, in a fifth possible implementation of the third aspect, the bit mapping processing performed by the mapping module is to map bits by using a code word, the code word is a multidimensional complex number vector and is used to represent a mapping relationship between bits and at least two modulation symbols, and the at least two modulation symbols include at least one non-zero modulation symbol and at least one zero modulation symbol.

With reference to any one of the third aspect or the first to the fifth possible implementations of the third aspect, in a sixth possible implementation of the third aspect, the first modulation symbol includes at least one non-zero modulation symbol and at least one zero modulation symbol.

With reference to the second or the third possible implementation of the third aspect, in a seventh possible implementation of the third aspect, the second modulation symbol includes at least one non-zero modulation symbol and at least one zero modulation symbol.

With reference to any one of the third aspect or the first to the seventh possible implementations of the third aspect, in an eighth possible implementation of the third aspect, the transmit end device is a network device; or the transmit end device is a terminal device.

According to a fourth aspect, a receive end device is provided, including: a receiving module, configured to receive a first modulation symbol matrix transmitted by a transmit end device, where the first modulation symbol matrix is generated by the transmit end device after the transmit end device performs precoding processing on a first modulation symbol according to a first precoding matrix of multiple preset precoding matrices, the first modulation symbol is generated by the transmit end device after the transmit end device performs bit mapping processing on a first part of bits of a first data bit group, the first precoding matrix is corresponding to a second part of bits of the first data bit group, and the first precoding matrix is corresponding to at least two antennas of N antennas included by the transmit end device, the first data bit group includes at least two bits, the first part of bits includes at least one bit, and the second part of bits is a bit of the first data bit group other than the first part of bits; and a determining module, configured to perform, according to the first modulation symbol matrix received by the receiving module, channel estimation on a channel corresponding to each precoding matrix, to determine the first data bit group.

With reference to the fourth aspect, in a first possible implementation of the fourth aspect, the determining module is specifically configured to: perform, according to the first modulation symbol matrix, channel estimation on the channel corresponding to each precoding matrix, to determine channel gains of channels corresponding to the multiple precoding matrices; decode the first modulation symbol matrix according to the channel gains, to obtain log-likelihood values corresponding to all combinations of modulation symbols and precoding matrices; and decode a combination, whose log-likelihood value is the largest, of a modulation symbol and a precoding matrix, to determine the first data bit group.

With reference to the first possible implementation of the fourth aspect, in a second possible implementation of the fourth aspect, the receive end device further includes: an obtaining module, configured to obtain prior information of the first data bit group, before the determining module decodes the combination, whose log-likelihood value is the largest, of a modulation symbol and a precoding matrix to determine the first data bit group; and the determining module is specifically configured to: decode, according to the prior information, the combination, whose log-likelihood value is the largest, of a modulation symbol and a precoding matrix, to determine the first data bit group.

With reference to any one of the fourth aspect or the first or the second possible implementation of the fourth aspect, in a third possible implementation of the fourth aspect, the receiving module is further configured to: receive at least one second modulation symbol matrix transmitted by the transmit end device, where the second modulation symbol matrix is generated by the transmit end device after the transmit end device performs precoding processing on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, the second precoding matrix is corresponding to at least two antennas of the N antennas included by the transmit end device, and superimposition processing is performed on the first modulation symbol matrix and the at least one second modulation symbol matrix by the transmit end device; and the determining module is specifically configured to: perform, according to the first modulation symbol matrix and the at least one second modulation symbol matrix, channel estimation on the channel corresponding to each precoding matrix, to determine the first data bit group and at least one second data bit group.

With reference to any one of the fourth aspect or the first to the third possible implementations of the fourth aspect, in a fourth possible implementation of the fourth aspect, the first modulation symbol includes at least one non-zero modulation symbol and at least one zero modulation symbol.

With reference to the third possible implementation of the fourth aspect, in a fifth possible implementation of the fourth aspect, the second modulation symbol includes at least one non-zero modulation symbol and at least one zero modulation symbol.

With reference to any one of the fourth aspect or the first to the fifth possible implementations of the fourth aspect, in a sixth possible implementation of the fourth aspect, the receive end device is a network device; or the receive end device is a terminal device.

According to a fifth aspect, a transmit end device is provided, where the transmit end device includes N antennas, and N≥2; and the transmit end device includes: a bus; a processor connected to the bus; a memory connected to the bus; and a transmitter connected to the bus; where the processor invokes, by using the bus, a program stored in the memory, to perform bit mapping processing on a first part of bits of a first data bit group, to generate a first modulation symbol, where the first data bit group includes at least two bits, and the first part of bits includes at least one bit; determine a first precoding matrix from multiple preset precoding matrices according to a second part of bits of the first data bit group, where the first precoding matrix is corresponding to at least two antennas of the N antennas, and the second part of bits is a bit of the first data bit group other than the first part of bits; and perform precoding processing on the first modulation symbol according to the first precoding matrix, to obtain a first modulation symbol matrix; and the transmitter invokes, by using the bus, the program stored in the memory, to transmit the first modulation symbol matrix to a receive end device by using the at least two antennas.

With reference to the fifth aspect, in a first possible implementation of the fifth aspect, the first precoding matrix includes R rows and C columns, where R is corresponding to a quantity of the at least two antennas, and C is corresponding to a quantity of non-zero symbols of the first modulation symbol.

With reference to the fifth aspect or the first possible implementation of the fifth aspect, in a second possible implementation of the fifth aspect, the transmitter is specifically configured to: perform superimposition processing on the first modulation symbol matrix and at least one second modulation symbol matrix, where the second modulation symbol matrix is generated after precoding processing is performed on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, and the second precoding matrix is corresponding to at least two antennas of the N antennas; and transmit the first modulation symbol matrix obtained after the superimposition processing to the receive end device by using the at least two antennas.

With reference to the second possible implementation of the fifth aspect, in a third possible implementation of the fifth aspect, a quantity of rows in the first modulation symbol matrix and a quantity of rows in the second modulation symbol matrix are equal, and a quantity of columns in the first modulation symbol matrix and a quantity of columns in the second modulation symbol matrix are equal.

With reference to any one of the fifth aspect or the first to the third possible implementations of the fifth aspect, in a fourth possible implementation of the fifth aspect, an element of the precoding matrix is 0 or 1.

With reference to any one of the fifth aspect or the first to the fourth possible implementations of the fifth aspect, in a fifth possible implementation of the fifth aspect, the bit mapping processing performed by the processor is to map bits by using a code word, the code word is a multidimensional complex number vector and is used to represent a mapping relationship between bits and at least two modulation symbols, and the at least two modulation symbols include at least one non-zero modulation symbol and at least one zero modulation symbol.

With reference to any one of the fifth aspect or the first to the fifth possible implementations of the fifth aspect, in a sixth possible implementation of the fifth aspect, the first modulation symbol includes at least one non-zero modulation symbol and at least one zero modulation symbol.

With reference to the second or the third possible implementation of the fifth aspect, in a seventh possible implementation of the fifth aspect, the second modulation symbol includes at least one non-zero modulation symbol and at least one zero modulation symbol.

With reference to any one of the fifth aspect or the first to the seventh possible implementations of the fifth aspect, in an eighth possible implementation of the fifth aspect, the transmit end device is a network device; or the transmit end device is a terminal device.

According to a sixth aspect, a receive end device is provided, where the receive end device includes: a bus a processor connected to the bus; a memory connected to the bus; and a receiver connected to the bus; where the receiver invokes, by using the bus, a program stored in the memory, to receive a first modulation symbol matrix transmitted by a transmit end device, where the first modulation symbol matrix is generated after the transmit end device performs precoding processing on a first modulation symbol according to a first precoding matrix of multiple preset precoding matrices, the first modulation symbol is generated after the transmit end device performs bit mapping processing on a first part of bits of a first data bit group, the first precoding matrix is corresponding to a second part of bits of the first data bit group, and the first precoding matrix is corresponding to at least two antennas of N antennas included by the transmit end device, the first data bit group includes at least two bits, the first part of bits includes at least one bit, and the second part of bits is a bit of the first data bit group other than the first part of bits; and the processor invokes, by using the bus, the program stored in the memory, to perform, according to the first modulation symbol matrix, channel estimation on a channel corresponding to each precoding matrix, to determine the first data bit group.

With reference to the sixth aspect, in a first possible implementation of the sixth aspect, the processor is specifically configured to: perform, according to the first modulation symbol matrix, channel estimation on the channel corresponding to each precoding matrix, to determine channel gains of channels corresponding to the multiple precoding matrices; decode the first modulation symbol matrix according to the channel gains, to obtain log-likelihood values corresponding to all combinations of modulation symbols and precoding matrices; and decode a combination, whose log-likelihood value is the largest, of a modulation symbol and a precoding matrix, to determine the first data bit group.

With reference to the first possible implementation of the sixth aspect, in a second possible implementation of the sixth aspect, the receiver is further configured to: obtain prior information of the first data bit group; and that the processor decodes the combination, whose log-likelihood value is the largest, of a modulation symbol and a precoding matrix, to determine the first data bit group includes: decoding, according to the prior information, the combination, whose log-likelihood value is the largest, of a modulation symbol and a precoding matrix, to determine the first data bit group.

With reference to any one of the sixth aspect or the first or the second possible implementation of the sixth aspect, in a third possible implementation of the sixth aspect, the receiver is further configured to: receive at least one second modulation symbol matrix transmitted by the transmit end device, where the second modulation symbol matrix is generated by the transmit end device after the transmit end device performs precoding processing on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, the second precoding matrix is corresponding to at least two antennas of the N antennas included by the transmit end device, and superimposition processing is performed on the first modulation symbol matrix and the at least one second modulation symbol matrix by the transmit end device; and that the processor performs, according to the first modulation symbol matrix, channel estimation on the channel corresponding to each precoding matrix, to determine the first data bit group includes: performing, according to the first modulation symbol matrix and the at least one second modulation symbol matrix, channel estimation on the channel corresponding to each precoding matrix, to determine the first data bit group and at least one second data bit group.

With reference to any one of the sixth aspect or the first to the third possible implementations of the sixth aspect, in a fourth possible implementation of the sixth aspect, the first modulation symbol includes at least one non-zero modulation symbol and at least one zero modulation symbol.

With reference to the third possible implementation of the sixth aspect, in a fifth possible implementation of the sixth aspect, the second modulation symbol includes at least one non-zero modulation symbol and at least one zero modulation symbol.

With reference to any one of the sixth aspect or the first to the fifth possible implementations of the sixth aspect, in a sixth possible implementation of the sixth aspect, the receive end device is a network device; or the receive end device is a terminal device.

Based on the foregoing technical solutions, according to the data transmission method, the transmit end device, and the receive end device in the embodiments of the present invention, one part of bits of a data bit group are mapped to modulation symbols, the other part of bits are used to determine a precoding matrix, and precoding processing is performed on the modulation symbols according to the precoding matrix, to obtain a modulation symbol matrix, so that data bits after being precoded can be corresponding to multiple antennas, and a problem of low transmission reliability in spatial modulation can be resolved.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 12 is a schematic flowchart of a data transmission method according to an embodiment of the present invention;

FIG. 13 is a schematic flowchart of data processing performed by a receive end device according to an embodiment of the present invention;

DETAILED DESCRIPTION OF ILLUSTRATIVE EMBODIMENTS

Figure 1:
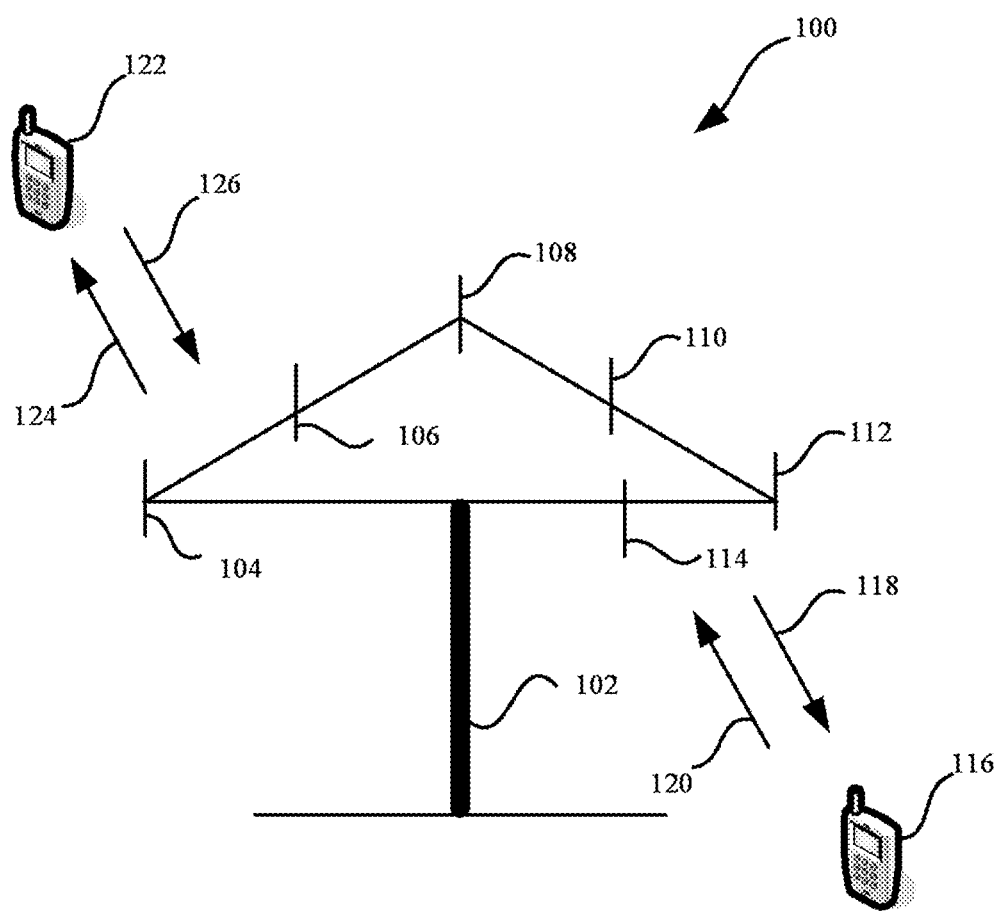
FIG. 1 is a schematic diagram of a communications system to which a data transmission method is used according to the present embodiments.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present embodiments.

Terminologies such as "component," "module," and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

In the present embodiments, the embodiments are described with reference to a terminal device. The terminal device may also be referred to as user equipment (UE), an access terminal, a subscriber unit, a subscriber station, a mobile station, a remote station, a remote terminal, a mobile device, a user terminal, a terminal, a radio communications device, a user agent, or a user apparatus. The access terminal may be a cellular phone, a cordless phone, a SIP (Session Initiation Protocol) phone, a WLL (Wireless Local Loop) station, a PDA (Personal Digital Assistant), a handheld device having a wireless communication function, a computing device, another processing device connected to a wireless modem, an in-vehicle device, a wearable device, or a terminal device in a future fifth generation (5G) network.

In addition, in the present embodiments, the embodiments are described with reference to a network device. The network device may be a base station or a device used to communicate with a mobile device. The base station may be a BTS (Base Transceiver Station) in the GSM (Global System for Mobile Communications) or the CDMA (Code Division Multiple Access), an NB (NodeB) in the WCDMA (Wideband Code Division Multiple Access), an eNB or an eNodeB (Evolved Node B) in the LTE (Long Term Evolution), a relay node or an access point, or an in-vehicle device, a wearable device, or a network device in a future 5G network.

In addition, aspects or features of the present embodiments may be implemented as a method, an apparatus or a product that uses standard programming and/or engineering technologies. The term "product" used in this application covers a computer program that can be accessed from any computer readable component, carrier, or medium. For example, the computer-readable medium may include but is not limited to: a magnetic storage component (for example, a hard disk, a floppy disk, or a magnetic tape), an optical disc (for example, a CD (Compact Disk), a DVD (Digital Versatile Disk), a smart card and a flash memory component (for example, EPROM (Erasable Programmable Read-Only Memory), a card, a stick, or a key drive). In addition, various storage media described in this specification may indicate one or more devices and/or other machine-readable media that are used to store information. The term "machine readable media" may include but is not limited to a radio channel, and various other media that can store, contain, and/or carry an instruction and/or data.

FIG. 1 is a schematic diagram of a communications system using a data transmission method according to the present embodiments. As shown in FIG. 1, the communications system 100 includes a network device 102, and the network device 102 may include multiple antenna sets. Each antenna set may include multiple antennas. For example, an antenna set may include antennas 104 and 106; another antenna set may include antennas 108 and 110; and an additional group may include antennas 112 and 114. In FIG. 1, two antennas are shown for each antenna set. However, more or less antennas may be used for each group. The network device 102 may additionally include a transmitter chain and a receiver chain. A person of ordinary skill in the art may understand that both the transmitter chain and the receiver chain may include multiple components (for example, a processor, a modulator, a multiplexer, a demodulator, a demultiplexer, or an antenna) related to signal transmission and reception.

The network device 102 may communicate with multiple terminal devices (for example, a terminal device 116 and a terminal device 122). It can be understood that the network device 102 may communicate with any quantity of terminal devices like the terminal device 116 or 122. The terminal devices 116 and 122 may be, for example, cellular phones, smartphones, portable computers, handheld communications devices, handheld computing devices, satellite radio apparatuses, global positioning systems, PDAs, and/or any other suitable devices that are used to communicate in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from a frequency band used by the reverse link 120, and the forward link 124 may use a frequency band different from a frequency band used by the reverse link 126.

For another example, in a time division duplex (TDD) system and a full duplex (Full Duplex) system, the forward link 118 and the reverse link 120 may use a same frequency band, and the forward link 124 and the reverse link 126 may use a same frequency band.

Each set of antennas and/or regions designed for communication are referred to as a sector of the network device 102. For example, an antenna set may be designed to communicate with a terminal device in the sector of a coverage region of the network device 102. In a process in which the network device 102 communicates with the terminal devices 116 and 122 by using the forward links 118 and 124 respectively, a transmit antenna of the network device 102 may improve signal-to-noise ratios of the forward links 118 and 124 by means of beamforming. In addition, compared with a manner in which a network device sends a signal to all terminal devices of the network device by using the single antenna, when the network device 102 sends a signal to the randomly dispersed terminal devices 116 and 122 in a related coverage region by means of beamforming, a mobile device in a neighboring cell suffers less interference.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits that need to be sent to the wireless communications receiving apparatus by using a channel. The data bits may be included in a data transmission block (or multiple transmission blocks), and the transmission block may be segmented to generate multiple code blocks.

Figure 2:
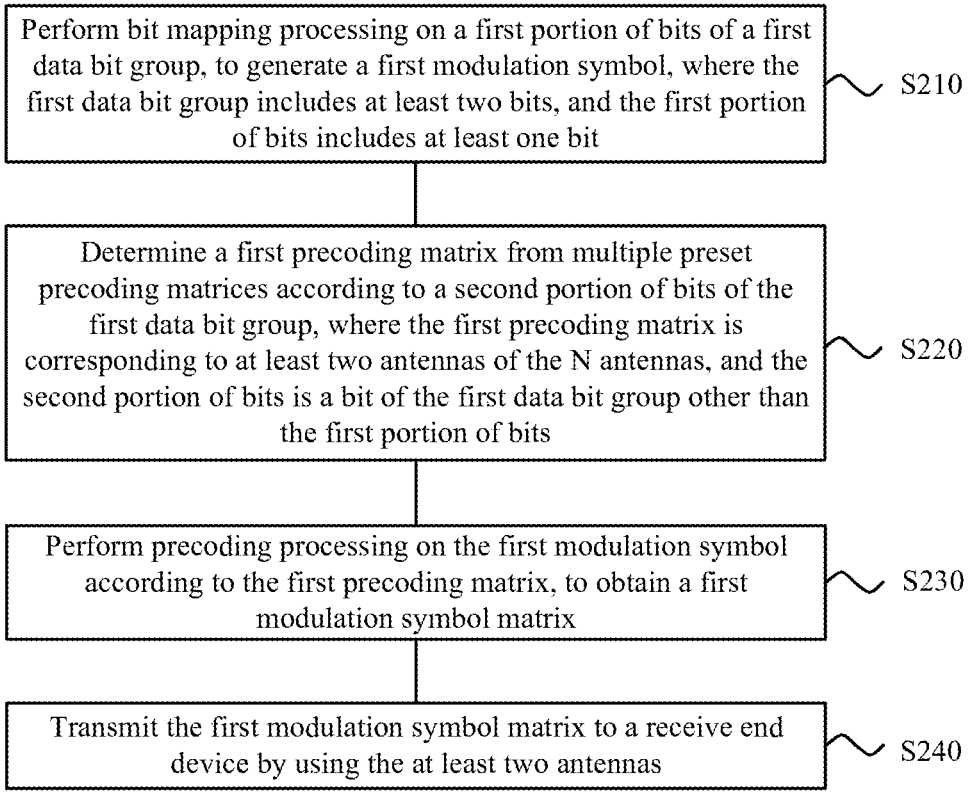
FIG. 2 is a schematic flowchart of a data transmission method according to an embodiment of the present invention.

FIG. 2 is a schematic flowchart of a data transmission method 200 according to an embodiment of the present invention. As shown in FIG. 2, the method 200 is executed by a transmit end device, the transmit end device includes N antennas, and N≥2. The method 200 includes:

S210. Perform bit mapping processing on a first part of bits of a first data bit group, to generate a first modulation symbol, where the first data bit group includes at least two bits, and the first part of bits includes at least one bit.

S220. Determine a first precoding matrix from multiple preset precoding matrices according to a second part of bits of the first data bit group, where the first precoding matrix is corresponding to at least two antennas of the N antennas, and the second part of bits is a bit of the first data bit group other than the first part of bits.

S230. Perform precoding processing on the first modulation symbol according to the first precoding matrix, to obtain a first modulation symbol matrix.

S240. Transmit the first modulation symbol matrix to a receive end device by using the at least two antennas.

Optionally, the transmit end device is a network device, or the transmit end device is a terminal device.

In this embodiment of the present invention, the transmit end device may be a network device (for example, a base station). That is, the method 200 may be applied to downlink transmission.

For ease of understanding and description, a process of the method 200 is described in detail by using an example that a network device serves as the transmit end device (that is, an execution body of the data transmission method 200 in this embodiment of the present invention) in the following.

Specifically, this embodiment of the present invention is applied to a multiple access technology, and may be applicable to spatial modulation using a code word of the sparse code multiple access (SCMA), low density spreading (LDS) multiple access, code division multiple access (CDMA), or the like, and especially be applicable to spatial modulation using the SCMA code word, that is, applicable to a case in which the first modulation symbol includes at least one non-zero modulation symbol and at least one zero modulation symbol. Alternatively, in S210, the bit mapping processing is to map bits by using a code word. The code word is a multidimensional complex number vector and is used to represent a mapping relationship between bits and at least two modulation symbols, and the at least two modulation symbols include at least one non-zero modulation symbol and at least one zero modulation symbol. In this specification, an SCMA code word is mainly used as an example for description. Similarly, this embodiment of the present invention may also be applied to another code word, and this is not limited in this embodiment of the present invention.

The SCMA is a non-orthogonal multiple access technology. With this technology, multiple different data streams are transmitted on a same resource element by using a codebook (that is, the multiple different data streams are multiplexed on the same resource element). Different data streams use different codebooks, and therefore, an objective of improving resource utilization is achieved. The data streams may come from same user equipment or may come from different user equipment.

The codebook used by the SCMA is a set of two or more code words.

The code word may be represented as the multidimensional complex number vector with two or more dimensions and that is used to represent a mapping relationship between data and two or more modulation symbols. The modulation symbol includes at least one zero modulation symbol and at least one non-zero modulation symbol. The data may be binary bit data or non-binary data.

The codebook includes two or more code words. The codebook may represent a mapping relationship between a possible data combination of data in a particular length and a code word in the codebook.

With the SCMA technology, data in a data stream is directly mapped to a code word, that is, a multidimensional complex number vector, in a codebook according to a particular mapping relationship, so that data is spread and transmitted on multiple resource elements. The data herein may be binary bit data or non-binary data. The multiple resource elements may be a resource element of a time domain, a frequency domain, a space domain, a space-time domain, or a time-frequency-space domain.

A signature sequence in this specification is corresponding to a codebook and includes an element 0 and an element 1. The element 0 represents that elements, of code words in the corresponding codebook, in locations corresponding to the element 0 are all 0s. The element 1 represents that elements, of code words in a corresponding codebook, in locations corresponding to the element 1 are not all 0s or none is 0. Two or more signature sequences compose a signature matrix. It should be understood that, the SCMA is only a name, and another name may also be used to represent the technology in the art.

A code word used in the SCMA may have particular sparsity. For example, a quantity of zero elements of the code word may be no less than a quantity of non-zero elements, so that a receive end can perform low complexity decoding by using a multiuser detection technology. Herein, the foregoing exemplified relationship between a quantity of zero elements and a modulation symbol is merely an example of sparsity, and the present embodiments do not limit thereto. A propart of a quantity of zero elements to a quantity of non-zero elements may be set arbitrarily according to a requirement.

This SCMA system may be used as an example of the communications system 100. In this system 100, multiple users use a same time-frequency resource block for data transmission. Each resource block includes some resource REs. The RE herein may be a subcarrier-symbol unit in an OFDM technology, or may be a time-domain or frequency-domain resource element in another air interface technology. For example, in an SCMA system including L terminal devices, an available resource is divided into some orthogonal time-frequency resource blocks. Each resource block includes U REs, and the U REs may be at a same location in a time domain. When a terminal device #L sends data, to-be-sent data is first divided into data blocks whose sizes each are S bits, each data block is mapped to a modulation symbol sequence X#L={X#L$_1$, X#L$_2$, ..., X#L$_U$} including U modulation symbols, by looking up a codebook (which is determined and delivered by a network device to the terminal device), with each modulation symbol in the sequence corresponding to one RE in the resource block, and then, a signal waveform is generated according to the modulation symbols. For the data blocks whose sizes are S bits, each codebook includes 2S different modulation symbol groups, which are corresponding to 2S possible data blocks.

The codebook may also be referred to as an SCMA codebook, which is a set of SCMA code words. The SCMA code word is a relationship that an information bit is mapped to a modulation symbol. That is, the SCMA codebook is a set of the mapping relationships.

In addition, in the SCMA, among a modulation symbol group X#k={X#k$_1$, X#k$_2$, ..., X#k$_L$} corresponding to each terminal device, at least one symbol is a zero symbol, and at least one symbol is a non-zero symbol. That is, for data of a terminal device, only some REs (at least one RE) of L REs carry the data of the terminal device.

Figure 3:
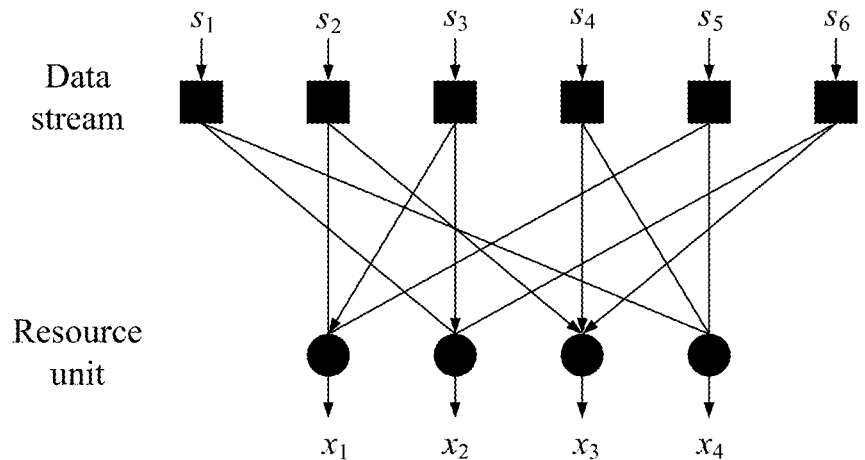
FIG. 3 is a schematic diagram of SCMA bit mapping processing.

FIG. 3 is a schematic diagram of SCMA bit mapping processing (or, encoding processing) in which six data streams are multiplexed on four resource elements is used as an example. The schematic diagram is a bipartite graph. As shown in FIG. 3, the six data streams compose a group, and the four resource elements compose an encoding unit. The resource element may be a subcarrier, an RE, or an antenna port.

In FIG. 3, if there is a line between a data stream and a resource element, it indicates that after at least one data combination of the data stream is mapped by using a code word, a non-zero modulation symbol is sent on the resource element. If there is no line between a data stream and a resource element, it indicates that after all possible data combinations of the data stream are mapped by using a code word, modulation symbols sent on the resource element are all 0s. The data combination of the data stream may be understood according to the following explanation. For example, in a binary bit data stream, 00, 01, 10, and 11 are all possible two-bit data combinations.

For ease of description, s1 to s6 are used to sequentially represent to-be-sent data combinations of the six data streams in FIG. 3, and x1 to x4 are used to sequentially represent symbols sent on the four resource elements in FIG. 3. A line between a data stream and a resource element represents that after data of the data stream is spread, a modulation symbol is sent on the resource element. The modulation symbol may be a zero modulation symbol (corresponding to a zero element), or may be a non-zero modulation symbol (corresponding to a non-zero element). If there is no line between a data stream and a resource element, it represents that after data of the data stream is spread, no modulation symbol is sent on the resource element.

It can be learned from FIG. 3 that after data of each data stream is mapped by using a code word, a modulation symbol is sent on two or more resource elements, and a symbol sent on each resource element is obtained by superimposing modulation symbols obtained after data from two or more data streams is mapped by using respective code words. For example, after a to-be-sent data combination s3 of a data stream 3 is mapped by using a code word, a non-zero modulation symbol may be sent on a resource element 1 and a resource element 2, and a symbol x3 sent on a resource element 3 is obtained by superimposing non-zero modulation symbols obtained after to-be-sent data combinations s2, s4, and s6 of a data stream 2, a data stream 4, and a data stream 6 are mapped by using respective code words. A quantity of data streams may be greater than a quantity of resource elements. This SCMA system can effectively improve a network capacity, including a quantity of users that can connect to the system, spectral efficiency, and the like.

With reference to the foregoing descriptions of the codebook and FIG. 3, a code word in the codebook is generally in the following form:

$$\begin{pmatrix} c_{1,q} \\ c_{2,q} \\ \vdots \\ c_{N,q} \end{pmatrix}.$$

In addition, a corresponding codebook is generally in the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where N is a positive integer greater than 1, and may represent a quantity of resource elements included in an encoding unit, or may be understood as a code word length; $Q_m$ is a positive integer greater than 1, represents a quantity of code words included in the codebook, and is corresponding to a modulation order, where, for example, when quadrature phase shift keying (QPSK, Quadrature Phase Shift Keying) or 4-order modulation is used, $Q_m$ is 4; q is a positive integer, and $1 \leq q \leq Q_m$; and an element $c_{n,q}$ included in the codebook and the code word is a complex number, and $c_{n,q}$ may be mathematically expressed as:

$$c_{n,q} \in \{0, \alpha^* \exp(j^*\beta)\}, 1 \leq n \leq N, 1 \leq q \leq Q_m,$$

where $\alpha$ and $\beta$ may be any real number, and N and $Q_m$ may be positive integers.

The code word in the codebook and data may form a particular mapping relationship. For example, the code word in the codebook and a two-bit data combination of a binary data stream may form the following mapping relationship.

For example, "00" may correspond to a code word 1, that is, $$\begin{pmatrix} c_{1,1} \\ c_{2,1} \\ \vdots \\ c_{N,1} \end{pmatrix};$$

"01" may correspond to a code word 2, that is, $$\begin{pmatrix} c_{1,2} \\ c_{2,2} \\ \vdots \\ c_{N,2} \end{pmatrix};$$

"10" may correspond to a code word 3, that is, $$\begin{pmatrix} c_{1,3} \\ c_{2,3} \\ \vdots \\ c_{N,3} \end{pmatrix};$$

and

"11" may correspond to a code word 4, that is, $$\begin{pmatrix} c_{1,4} \\ c_{2,4} \\ \vdots \\ c_{N,4} \end{pmatrix}.$$

With reference to FIG. 3, when there is a line between a data stream and a resource element, a codebook corresponding to the data stream and a code word in the codebook need to have the following characteristic: There is at least one code word in the codebook for which a non-zero modulation symbol is sent on a corresponding resource element. For example, there is a line between the data stream 3 and the resource element 1, and there is at least one code word in a codebook corresponding to the data stream 3 satisfying $c_{1,q} \neq 0$, where $1 \leq q \leq Q_m$.

When there is no line between a data stream and a resource element, a codebook corresponding to the data stream and a code word in the codebook need to have the following characteristic: For all code words in the codebook, a modulation symbol being zero is sent on a corresponding resource element. For example, there is no line between the data stream 3 and the resource element 3, and any code word in a codebook corresponding to the data stream 3 satisfies $c_{3,q}=0$, where $1 \leq q \leq Q_m$.

In conclusion, when the modulation order is the QPSK, the codebook corresponding to the data stream 3 in FIG. 3 may have the following form and characteristic:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $c_{n,q}=\alpha*\exp(j*\beta)$, $1 \leq n \leq 2$, $1 \leq q \leq 4$, $\alpha$ and $\beta$ may be any real number; for any q, $1 \leq q \leq 4$, both $c_{1,q}$ and $c_{2,q}$ are not 0s; and there is at least one group of $q^1$ and $q^2$, where $1 \leq q_1$ and $q_2 \leq 4$, so that $c_{1,q_1} \neq 0$ and $c_{2,q_2} \neq 0$.

For example, if the data s3 of the data stream 3 is "10", this data combination is mapped, according to the foregoing mapping rule, to a code word, that is, a four-dimensional complex number vector:

$$\begin{pmatrix} c_{1,3} \\ c_{2,3} \\ 0 \\ 0 \end{pmatrix}.$$

Further, in the SCMA system, a bipartite graph may also be represented by using a signature matrix. The signature matrix may be in the following form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m}$ represents an element in the signature matrix, m and n are natural numbers, $1 \leq n \leq N, 1 \leq m \leq M$, N rows represent N resource elements in an encoding unit, and M columns represent a quantity of multiplexed data streams. Although the signature matrix may be expressed in a general form, the signature matrix may have the following characteristics:

(1) For an element $r_{n,m} \in \{0, 1\}$, $1 \leq n \leq N$, $1 \leq m \leq M$ in the signature matrix, explained by a corresponding bipartite graph, $r_{n,m}=1$ may represent that there is a line between the $m^{th}$ data stream and a resource element n, or may be understood as that at least one data combination of the $m^{th}$ data stream is mapped to a non-zero modulation symbol by using a code word. Explained by a corresponding bipartite graph, $r_{n,m}=0$ may represent that there is no line between the $m^{th}$ data stream and a resource element n, or may be understood as that all possible data combinations of the $m^{th}$ data stream are mapped to zero modulation symbols by using a code word.

(2) Further optionally, a quantity of elements 0 in the signature matrix may be no less than a quantity of elements 1, and this embodies a sparse encoding characteristic.

In addition, a column in the signature matrix may be referred to as a signature sequence. The signature sequence may be in the following form of expression:

$$\begin{pmatrix} r_{1,m} \\ r_{2,m} \\ \vdots \\ r_{N,m} \end{pmatrix}, 1 \leq m \leq M.$$

Therefore, the signature matrix may also be considered as a matrix including a series of signature sequences.

With reference to the foregoing description about the characteristic of the signature matrix, for an example given in FIG. 3, a corresponding signature matrix may be expressed as:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

A signature sequence corresponding to the codebook $$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

used by the data stream 3 in FIG. 3 may be expressed as:

$$\begin{pmatrix} 1 \\ 1 \\ 0 \\ 0 \end{pmatrix}.$$

It can be considered from the foregoing that a codebook is corresponding to a signature sequence in a one-to-one relationship. That is, one codebook is uniquely corresponding to one signature sequence. However, a signature sequence may be corresponding to a codebook in a one-to-many relationship. That is, one signature sequence is corresponding to one or more codebooks. Therefore, the signature sequence may be understood as: The signature sequence is corresponding to a codebook and includes an element 0 and an element 1; a location of the element 0 represents that elements, of code words in a corresponding codebook, in locations corresponding to the element 0 are all 0s; and the element 1 represents that elements, of code words in a corresponding codebook, in locations corresponding to the element 1 are not all 0s or none is 0. A correspondence between the signature sequence and the codebook may be determined by the following two conditions: (1) A code word in the codebook and the corresponding signature sequence have a same quantity of total elements; and (2) For any element location with a value 1 in the signature sequence, a code word can be found in the corresponding codebook, and elements of the code word at the same location are not 0. For any element location with a value 0 in the signature sequence, all elements, at the same location, of all code words in the corresponding codebook are 0.

It should further be understood that in the SCMA system, a codebook may be directly represented and stored. For example, the codebook described above or code words in the codebook are stored, or only an element, at a location corresponding to a signature sequence element 1, of the code word is stored. Therefore, during application of the present embodiments, it needs to be assumed that both a base station and user equipment in the SCMA system can store some or all of the following content designed in advance: (1) One or more SCMA signature matrices:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m} \in \{0, 1\}$, $1 \leq n \leq N$, $1 \leq m \leq M$, and both M and N are integers greater than 1, where M represents a quantity of multiplexed data streams, and N is a positive integer greater than 1, and may represent a quantity of resource elements included in one encoding unit, or may be understood to represent a code word length; (2) One or more SCMA signature sequences:

$$\begin{pmatrix} r_{1,m} \\ r_{2,m} \\ \vdots \\ r_{N,m} \end{pmatrix},$$

where $1 \leq m \leq M$; and (3) One or more SCMA codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where $Q_m \geq 2$, $Q_m$ may be a modulation order corresponding to the codebook, and each codebook may be corresponding to one modulation order, where N is a positive integer greater than 1, and may represent a quantity of resource elements included in an encoding unit, or may be understood to represent a code word length.

It should be understood that the foregoing exemplified SCMA system is merely an example of a communications system to which the data transmission method and apparatus of the present embodiments are applicable. The present embodiments do not limit thereto. Another communications system in which terminal devices can use a same time-frequency resource in a same time period to transmit data falls within the protection scope of the present embodiments.

In the SCMA technology, when there is one user using a resource block (RB) to connect to a network, user data may be transmitted by using one data layer, or may be transmitted at multiple data layers. When there are multiple users using a resource block to connect to a network, generally, user data is transmitted at multiple data layers, by multiplexing the data layers.

For a data layer, data bits at the data layer may be divided into groups, and each group includes K bits, with K being an integer greater than 2. That is, this first data bit group includes at least two bits. The K bits are determined to be the first data bit group, and then, the first data bit group is allocated. A first part of bits includes at least one bit ($K_1$ bits), which is used for bit mapping processing to generate a first modulation symbol, that is, determining a code word from a preset codebook. A second part of bits is a bit ($K_2$ bits) in the first data bit group other than the first part of bits, and is used to determine a first precoding matrix from multiple preset precoding matrices. The first precoding matrix is corresponding to at least two antennas of N antennas of a transmit end device. The first modulation symbol is precoded according to the first precoding matrix, so that a first modulation symbol matrix can be obtained. Each row of modulation symbols in the first modulation symbol matrix is corresponding to at least two antennas. That is, a quantity of rows in the first modulation symbol matrix is corresponding to a corresponding quantity of the at least two antennas, and a quantity of columns in the first modulation symbol matrix is corresponding to a quantity of symbols of the first modulation symbol.

Preferably, the first precoding matrix includes R rows and C columns. R is corresponding to a quantity of the at least two antennas, and C is corresponding to a quantity of non-zero symbols of the first modulation symbol.

It should be understood that the precoding in this embodiment of the present embodiments may be multiple input multiple output (Multiple Input Multiple Output, MIMO) precoding, or another precoding manner may be used. This is not limited in this embodiment of the present invention.

Therefore, according to the data transmission method in this embodiment of the present invention, one part of bits of a data bit group are mapped to modulation symbols, the other part of bits are used to determine a precoding matrix, and precoding processing is performed on the modulation symbols according to the precoding matrix, to obtain a modulation symbol matrix, so that data bits after being precoded can be corresponding to multiple antennas, and a problem of low transmission reliability in spatial modulation can be resolved.

Figure 4:
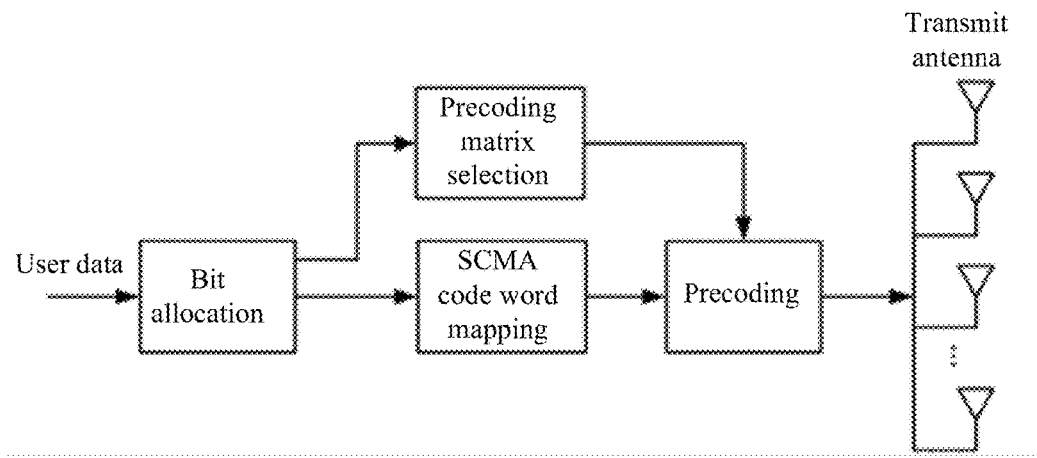
FIG. 4 is a schematic flowchart of data processing performed by a transmit end device according to an embodiment of the present invention.

Optionally, in an embodiment, using an SCMA code word as an example, when data is transmitted by using a data layer, data bits at the data layer after being precoded are transmitted by using multiple transmit antennas, and each row in a modulation symbol matrix is corresponding to one antenna. After each data bit group is modulated into a modulation symbol matrix, a corresponding transmit antenna sequentially transmits modulation symbols corresponding to the transmit antenna. FIG. 4 is a schematic flowchart of data processing performed by a transmit end device according to a method 200 in an embodiment of the present invention. As shown in FIG. 4, after obtaining a to-be-sent data bit group, the transmit end device first allocates the data bit group. For each data bit group, SCMA code words corresponding to $K_1$ bits are selected from multiple SCMA codebooks according to the $K_2$ bits of this group of data bits (that is, bit mapping processing is performed to generate a first modulation symbol); and a first precoding matrix corresponding to the $K_2$ bits is selected from multiple preset precoding matrices according to the $K_2$ bits of the data bit group. Then, the generated first modulation symbol is precoded according to the selected precoding matrix, a modulation symbol matrix corresponding to the data bit group is obtained, and rows in the modulation symbol matrix are transmitted by using corresponding transmit antennas. For example, the first row of modulation symbols in the modulation symbol matrix is transmitted by using an antenna whose number is 1; the second row of modulation symbols in the modulation symbol matrix is transmitted by using an antenna whose number is 2; and so on.

Optionally, in an embodiment, the first part of bits and the second part of bits are bits at different locations, of the K bits, and $K_1+K_2=K$. For example, each data bit group includes three bits, among which the first bit is used to determine the precoding matrix, and the second and third bits are used for mapping to generate the first modulation symbol. For example, the multiple preset precoding matrices include:

$$W^1 = \begin{vmatrix} 1 & 0 \\ 0 & 1 \end{vmatrix},$$

and $$W^2 = \begin{vmatrix} 0 & 1 \\ 1 & 0 \end{vmatrix} \cdot W^1 = \begin{vmatrix} 1 & 0 \\ 0 & 1 \end{vmatrix},$$

is corresponding to a bit 0, and:

$$W^2 = \begin{vmatrix} 0 & 1 \\ 1 & 0 \end{vmatrix},$$

is corresponding to a bit 1. The SCMA codebook is shown in Table 1. When data bits are 010, the first bit 0 is corresponding to the precoding matrix:

$$W^1 = \begin{vmatrix} 1 & 0 \\ 0 & 1 \end{vmatrix},$$

and an SCMA code word (that is, the first modulation symbol) corresponding to the second and third bits 10 is (−1−i, −1−i, 0, 0).

TABLE 1

| 00 | (1 + i, 1 + i, 0, 0) |
| 01 | (−1 + i, −1 + i, 0, 0) |
| 10 | (−1 − i, −1 − i, 0, 0) |
| 11 | (1 − i, 1 − i, 0, 0) |

It should be understood that the K bits of each data bit group may be contiguous bits or non-contiguous bits.

Optionally, in an embodiment, the first precoding matrix includes R rows and C columns. R is corresponding to a quantity of the at least two antennas, and C is corresponding to a quantity of non-zero symbols of the first modulation symbol. For the foregoing described precoding matrix:

$$W^1 = \begin{vmatrix} 1 & 0 \\ 0 & 1 \end{vmatrix},$$

includes two rows and two columns, the two rows are corresponding to two antennas, and an SCMA code word (the first modulation symbol) in an SCMA codebook corresponding to the two columns includes two non-zero symbols.

It should be understood that an element in the precoding matrix may be any complex number value, which preferably may be 0 or 1. This is not limited in this embodiment of the present invention. Similarly, an element of the SCMA code word may also be any complex number value. This is not limited in this embodiment of the present invention.

The data transmission method in this embodiment of the present invention is described in detail by using some detailed examples in the following.

Figure 5:
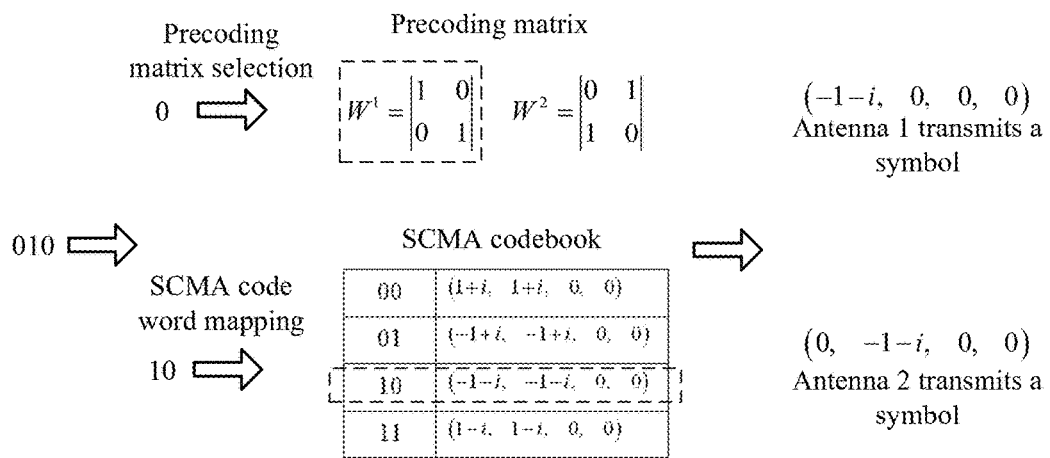
FIG. 5 is a schematic diagram of a data transmission method according to an embodiment of the present invention.

FIG. 5 shows example 1. The example 1 is a spatial modulation scheme in which there are two transmit antennas and an SCMA code word length is 4 (with two non-zero symbols).

The multiple preset precoding matrices include:

$$W^1 = \begin{vmatrix} 1 & 0 \\ 0 & 1 \end{vmatrix}, \text{ and}$$

$$W^2 = \begin{vmatrix} 0 & 1 \\ 1 & 0 \end{vmatrix} \cdot W^1 = \begin{vmatrix} 1 & 0 \\ 0 & 1 \end{vmatrix},$$

is corresponding to a bit 0, and $$W^2 = \begin{vmatrix} 0 & 1 \\ 1 & 0 \end{vmatrix}$$

is corresponding to a bit 1. The SCMA codebook is shown in Table 1. When the first data bit group is 010, the first bit 0 is corresponding to the first precoding matrix $$W^1 = \begin{vmatrix} 1 & 0 \\ 0 & 1 \end{vmatrix},$$

and the first modulation symbol (a first code word) corresponding to the second and third bits 10 is (−1−i, −1−i, 0, 0).

The first modulation symbol (−1−i, −1−i, 0, 0) is precoded according to the first precoding matrix:

$$W^1 = \begin{vmatrix} 1 & 0 \\ 0 & 1 \end{vmatrix},$$

to obtain the first modulation symbol matrix corresponding to the first data bit group 010. Specifically, the first row of elements in the first precoding matrix is multiplied by a non-zero symbol of the first modulation symbol, to obtain a non-zero element in the first row in the first modulation symbol matrix. Then, a 0 is padded as an element in the first row in the first modulation symbol matrix according to a location of a zero symbol of the first modulation symbol. An operation similar to that on the first row is performed on the second row, to obtain that the first modulation symbol matrix corresponding to the first data bit group 010 is:

$$\begin{pmatrix} -1-i & 0 & 0 & 0 \\ 0 & -1-i & 0 & 0 \end{pmatrix}.$$

A number of an antenna corresponding to the first row in the first modulation symbol matrix is 1, and therefore, the antenna 1 transmits a symbol (−1−i, 0, 0, 0). A number of an antenna corresponding to the second row in the first modulation symbol matrix is 2, and therefore, the antenna 2 transmits a symbol (0, −1−i, 0, 0).

Figure 6:
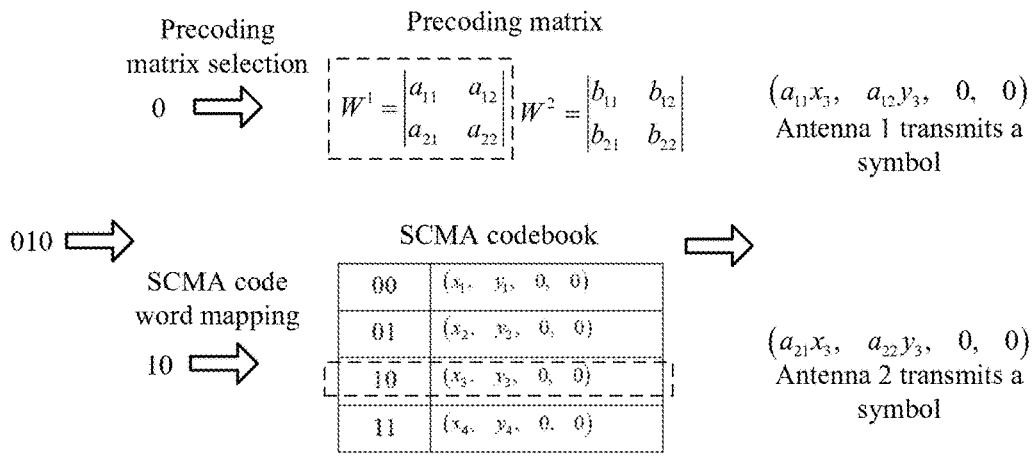
FIG. 6 is a schematic diagram of a data transmission method according to an embodiment of the present invention.

FIG. 6 shows example 2. The example 2 is another spatial modulation scheme in which there are two transmit antennas and an SCMA code word length is 4 (with two non-zero symbols).

The multiple preset precoding matrices include:

$$W^1 = \begin{vmatrix} a_{11} & a_{12} \\ a_{21} & a_{22} \end{vmatrix}, \text{ and}$$

$$W^2 = \begin{vmatrix} b_{11} & b_{12} \\ b_{21} & b_{22} \end{vmatrix} \cdot W^1 = \begin{vmatrix} a_{11} & a_{12} \\ a_{21} & a_{22} \end{vmatrix},$$

is corresponding to a bit 0, and $$W^2 = \begin{vmatrix} b_{11} & b_{12} \\ b_{21} & b_{22} \end{vmatrix}$$

is corresponding to a bit 1. The SCMA codebook is shown in Table 2. When the first data bit group is 010, the first bit 0 is corresponding to the first precoding matrix $$W^1 = \begin{vmatrix} a_{11} & a_{12} \\ a_{21} & a_{22} \end{vmatrix},$$

and the first modulation symbol (a first code word) corresponding to the second and third bits 10 is ($x_3$ $y_3$ 0 0).

TABLE 2

| | |
|---|---|
| 00 | ($x_1$, $y_1$, 0, 0) |
| 01 | ($x_2$, $y_2$, 0, 0) |
| 10 | ($x_3$, $y_3$, 0, 0) |
| 11 | ($x_4$, $y_4$, 0, 0) |

The first modulation symbol ($x_3$ $y_3$ 0 0) is precoded according to the first precoding matrix:

$$W^1 = \begin{vmatrix} a_{11} & a_{12} \\ a_{21} & a_{22} \end{vmatrix},$$

to obtain the first modulation symbol matrix corresponding to the first data bit group 010. Specifically, the first row of elements in the first precoding matrix is multiplied by a non-zero symbol of the first modulation symbol, to obtain a non-zero element in the first row in the first modulation symbol matrix. Then, a 0 is padded as an element in the first row in the first modulation symbol matrix according to a location of a zero symbol of the first modulation symbol. An operation similar to that on the first row is performed on the second row, to obtain that the first modulation symbol matrix corresponding to the first data bit group 010 is $$\begin{pmatrix} a_{11}x_3 & a_{12}y_3 & 0 & 0 \\ a_{21}x_3 & a_{22}y_3 & 0 & 0 \end{pmatrix}.$$

A number of an antenna corresponding to the first row in the first modulation symbol matrix is 1, and therefore, the antenna 1 transmits a symbol ($a_{11}x_3$, $a_{12}y_3$, 0, 0). A number of an antenna corresponding to the second row in the first modulation symbol matrix is 2, and therefore, the antenna 2 transmits a symbol ($a_{21}x_3$, $a_{12}y_3$, 0, 0).

Figure 7:
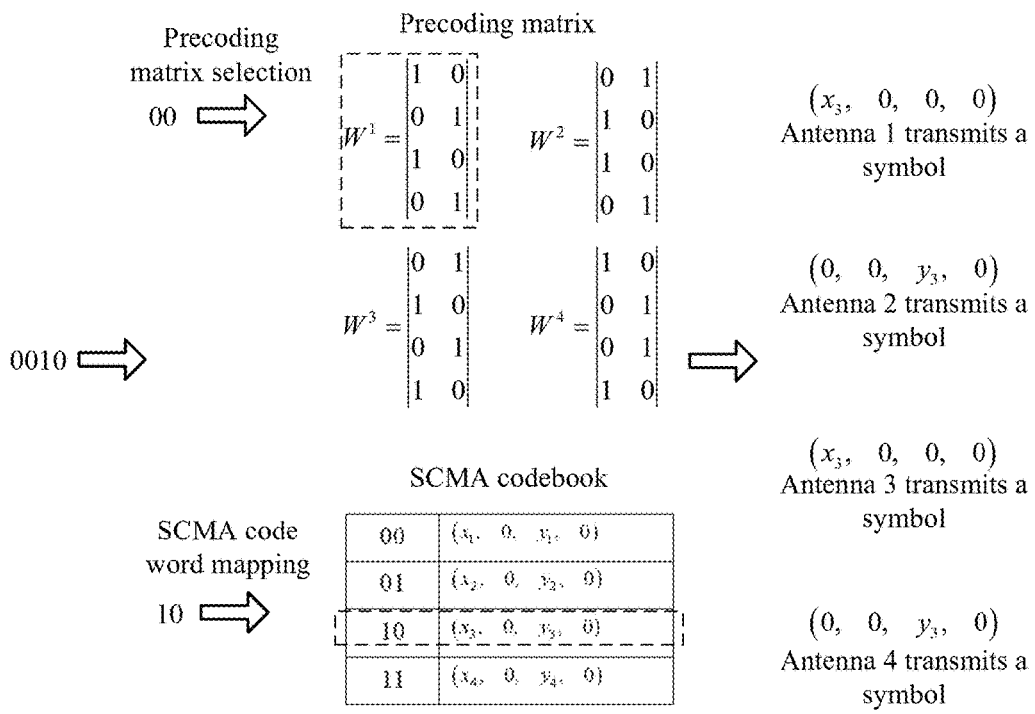
FIG. 7 is a schematic diagram of a data transmission method according to an embodiment of the present invention.

FIG. 7 shows example 3. The example 3 is a spatial modulation scheme in which there are four transmit antennas and an SCMA code word length is 4 (with two non-zero symbols).

The multiple preset precoding matrices include:

$$W^1 = \begin{vmatrix} 1 & 0 \\ 0 & 1 \\ 1 & 0 \\ 0 & 1 \end{vmatrix}, W^2 = \begin{vmatrix} 0 & 1 \\ 1 & 0 \\ 1 & 0 \\ 0 & 1 \end{vmatrix}, W^3 = \begin{vmatrix} 0 & 1 \\ 1 & 0 \\ 0 & 1 \\ 1 & 0 \end{vmatrix}, \text{ and}$$

$$W^4 = \begin{vmatrix} 1 & 0 \\ 0 & 1 \\ 0 & 1 \\ 1 & 0 \end{vmatrix} \cdot W^1 = \begin{vmatrix} 1 & 0 \\ 0 & 1 \\ 1 & 0 \\ 0 & 1 \end{vmatrix}$$

is corresponding to bits 00, $$W^2 = \begin{vmatrix} 0 & 1 \\ 1 & 0 \\ 1 & 0 \\ 0 & 1 \end{vmatrix}$$

is corresponding to bits 01, $$W^3 = \begin{vmatrix} 0 & 1 \\ 1 & 0 \\ 0 & 1 \\ 1 & 0 \end{vmatrix}$$

is corresponding to bits 10, and $$W^4 = \begin{vmatrix} 1 & 0 \\ 0 & 1 \\ 0 & 1 \\ 1 & 0 \end{vmatrix}$$

is corresponding to bits 11. The SCMA codebook is shown in Table 3. When the first data bit group is 0010, the first and second bits 00 are corresponding to the first precoding matrix $$W^1 = \begin{vmatrix} 1 & 0 \\ 0 & 1 \\ 1 & 0 \\ 0 & 1 \end{vmatrix},$$

and the first modulation symbol (a first code word) corresponding to the third and fourth bits 10 is $(x_3, 0, y_3, 0)$.

TABLE 3

| | |
|---|---|
| 00 | $(x_1, 0, y_1, 0)$ |
| 01 | $(x_2, 0, y_2, 0)$ |
| 10 | $(x_3, 0, y_3, 0)$ |
| 11 | $(x_4, 0, y_4, 0)$ |

The first modulation symbol $(x_3, 0, y_3, 0)$ is precoded according to the first precoding matrix:

$$W^1 = \begin{vmatrix} 1 & 0 \\ 0 & 1 \\ 1 & 0 \\ 0 & 1 \end{vmatrix},$$

to obtain the first modulation symbol matrix corresponding to the first data bit group 0010. Specifically, the first row of elements in the first precoding matrix is multiplied by a non-zero symbol of the first modulation symbol, to obtain a non-zero element in the first row in the first modulation symbol matrix. Then, a 0 is padded as an element in the first row in the first modulation symbol matrix according to a location of a zero symbol of the first modulation symbol. An operation similar to that on the first row is performed on the second row, the third row, and the fourth row to obtain that the first modulation symbol matrix corresponding to the first data bit group 0010 is:

$$\begin{pmatrix} x_3 & 0 & 0 & 0 \\ 0 & 0 & y_3 & 0 \\ x_3 & 0 & 0 & 0 \\ 0 & 0 & y_3 & 0 \end{pmatrix}.$$

A number of an antenna corresponding to the first row in the first modulation symbol matrix is 1, and therefore, the antenna 1 transmits a symbol $(x_3, 0, 0, 0)$. A number of an antenna corresponding to the second row in the first modulation symbol matrix is 2, and therefore, the antenna 2 transmits a symbol $(0, 0, y_3, 0)$. A number of an antenna corresponding to the third row in the first modulation symbol matrix is 3, and therefore, the antenna 3 transmits a symbol $(x_3, 0, 0, 0)$. A number of an antenna corresponding to the fourth row in the first modulation symbol matrix is 4, and therefore, the antenna 4 transmits a symbol $(0, 0, y_3, 0)$.

Figure 8:
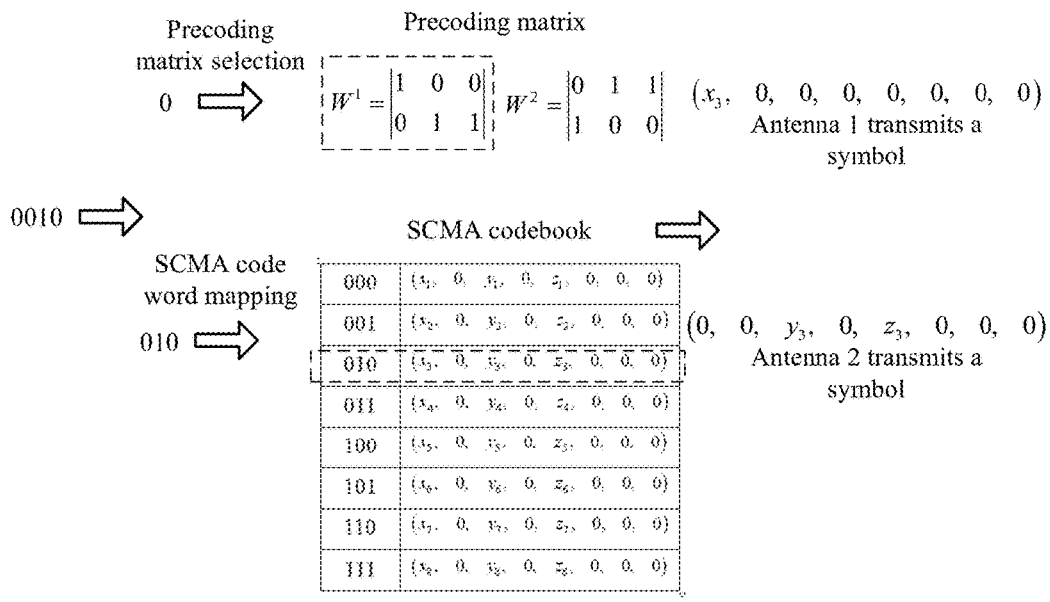
FIG. 8 is a schematic diagram of a data transmission method according to an embodiment of the present invention.

FIG. 8 shows example 4. The example 4 is a spatial modulation scheme in which there are two transmit antennas and an SCMA code word length is 8 (with three non-zero symbols).

The multiple preset precoding matrices include:

$$W^1 = \begin{vmatrix} 1 & 0 & 0 \\ 0 & 1 & 1 \end{vmatrix}, \text{ and}$$

$$W^2 = \begin{vmatrix} 0 & 1 & 1 \\ 1 & 0 & 0 \end{vmatrix} \cdot W^1 = \begin{vmatrix} 1 & 0 & 0 \\ 0 & 1 & 1 \end{vmatrix}$$

is corresponding to a bit 0, and $$W^2 = \begin{vmatrix} 0 & 1 & 1 \\ 1 & 0 & 0 \end{vmatrix}$$

is corresponding to a bit 1. The SCMA codebook is shown in Table 4. When the first data bit group is 0010, the first bit 0 is corresponding to the first precoding matrix $$W^1 = \begin{vmatrix} 1 & 0 & 0 \\ 0 & 1 & 1 \end{vmatrix},$$

and the first modulation symbol (a first code word) corresponding to the second to fourth bits 010 is $(x_3, 0, y_3, 0, z_3, 0, 0, 0)$.

TABLE 4

| | |
|---|---|
| 000 | $(x_1, 0, y_1, 0, z_1, 0, 0, 0)$ |
| 001 | $(x_2, 0, y_2, 0, z_2, 0, 0, 0)$ |
| 010 | $(x_3, 0, y_3, 0, z_3, 0, 0, 0)$ |
| 011 | $(x_4, 0, y_4, 0, z_4, 0, 0, 0)$ |
| 100 | $(x_5, 0, y_5, 0, z_5, 0, 0, 0)$ |
| 101 | $(x_6, 0, y_6, 0, z_6, 0, 0, 0)$ |
| 110 | $(x_7, 0, y_7, 0, z_7, 0, 0, 0)$ |
| 111 | $(x_8, 0, y_8, 0, z_8, 0, 0, 0)$ |

The first modulation symbol $(x_3, 0, y_3, 0, z_3, 0, 0, 0)$ is precoded according to the first precoding matrix:

$$W^1 = \begin{vmatrix} 1 & 0 & 0 \\ 0 & 1 & 1 \end{vmatrix},$$

to obtain the first modulation symbol matrix corresponding to the first data bit group 0010. Specifically, the first row of elements in the first precoding matrix is multiplied by a non-zero symbol of the first modulation symbol, to obtain a non-zero element in the first row in the first modulation symbol matrix. Then, a 0 is padded as an element in the first row in the first modulation symbol matrix according to a location of a zero symbol of the first modulation symbol. An operation similar to that on the first row is performed on the second row, to obtain that the first modulation symbol matrix corresponding to the first data bit group 0010 is $$\begin{pmatrix} x_3 & 0 & 0 & 0 & 0 & 0 & 0 & 0 \\ 0 & 0 & y_3 & 0 & z_3 & 0 & 0 & 0 \end{pmatrix}.$$

A number of an antenna corresponding to the first row in the first modulation symbol matrix is 1, and therefore, the antenna 1 transmits a symbol $(x_3, 0, 0, 0, 0, 0, 0, 0)$. A number of an antenna corresponding to the second row in the first modulation symbol matrix is 2, and therefore, the antenna 2 transmits a symbol $(0, 0, y_3, 0, z_3, 0, 0, 0)$.

Figure 9:
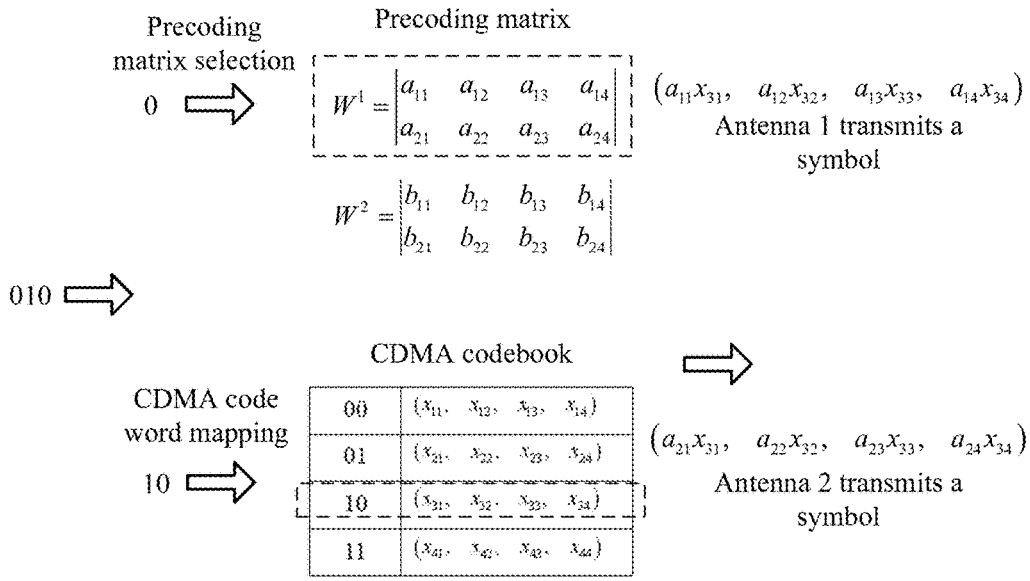
FIG. 9 is a schematic diagram of a data transmission method according to an embodiment of the present invention.

FIG. 9 shows example 5. The example 5 is a spatial modulation scheme in which there are two transmit antennas, and a CDMA code word length is 4. CDMA code words meet orthogonality.

The multiple preset precoding matrices include:

$$W^1 = \begin{vmatrix} a_{11} & a_{12} & a_{13} & a_{14} \\ a_{21} & a_{22} & a_{23} & a_{24} \end{vmatrix}, \text{ and}$$

$$W^2 = \begin{vmatrix} b_{11} & b_{12} & b_{13} & b_{14} \\ b_{21} & b_{22} & b_{23} & b_{24} \end{vmatrix} \cdot W^1 = \begin{vmatrix} a_{11} & a_{12} & a_{13} & a_{14} \\ a_{21} & a_{22} & a_{23} & a_{24} \end{vmatrix}$$

is corresponding to a bit 0, and $$W^2 = \begin{vmatrix} b_{11} & b_{12} & b_{13} & b_{14} \\ b_{21} & b_{22} & b_{23} & b_{24} \end{vmatrix}$$

is corresponding to a bit 1. A CDMA codebook is shown in Table 5. When the first data bit group is 010, the first bit 0 is corresponding to the first precoding matrix $$W^1 = \begin{vmatrix} a_{11} & a_{12} & a_{13} & a_{14} \\ a_{21} & a_{22} & a_{23} & a_{24} \end{vmatrix},$$

and the first modulation symbol (a first code word) corresponding to the second and third bits 10 is $(x_3, 0, y_3, 0, z_3, 0, 0, 0)$.

TABLE 5

| | |
|---|---|
| 00 | $(x_{11}, x_{12}, x_{13}, x_{14})$ |
| 01 | $(x_{21}, x_{22}, x_{23}, x_{24})$ |
| 10 | $(x_{31}, x_{32}, x_{33}, x_{34})$ |
| 11 | $(x_{41}, x_{42}, x_{43}, x_{44})$ |

The first modulation symbol $(x_{31}, x_{32}, x_{33}, x_{34})$ is precoded according to the first precoding matrix:

$$W^1 = \begin{vmatrix} a_{11} & a_{12} & a_{13} & a_{14} \\ a_{21} & a_{22} & a_{23} & a_{24} \end{vmatrix},$$

to obtain the first modulation symbol matrix corresponding to the first data bit group 010. Specifically, the first row of elements in the first precoding matrix is multiplied by a symbol of the first modulation symbol, to obtain an element in the first row in the first modulation symbol matrix. An operation similar to that on the first row is performed on the second row, to obtain that the first modulation symbol matrix corresponding to the first data bit group 010 is:

$$\begin{pmatrix} a_{11}x_{31} & a_{12}x_{32} & a_{13}x_{33} & a_{14}x_{34} \\ a_{21}x_{31} & a_{22}x_{32} & a_{23}x_{33} & a_{24}x_{34} \end{pmatrix}.$$

A number of an antenna corresponding to the first row in the first modulation symbol matrix is 1, and therefore, the antenna 1 transmits a symbol $(a_{11}x_{31}, a_{12}x_{32}, a_{13}x_{33}, a_{14}x_{34})$. A number of an antenna corresponding to the second row in the first modulation symbol matrix is 2, and therefore, the antenna 2 transmits a symbol $(a_{21}x_{31}, a_{22}x_{32}, a_{23}x_{33}, a_{24}x_{34})$.

Optionally, in an embodiment, using an SCMA code word as an example, the transmitting the first modulation symbol matrix to a receive end device by using the at least two antennas includes: performing superimposition processing on the first modulation symbol matrix and at least one second modulation symbol matrix, where the second modulation symbol matrix is generated after precoding processing is performed on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, and the second precoding matrix is corresponding to at least two antennas of the N antennas; and transmitting the first modulation symbol matrix obtained after the superimposition processing to the receive end device by using the at least two antennas.

Optionally, the second modulation symbol includes at least one non-zero modulation symbol and at least one zero modulation symbol.

Figure 10:
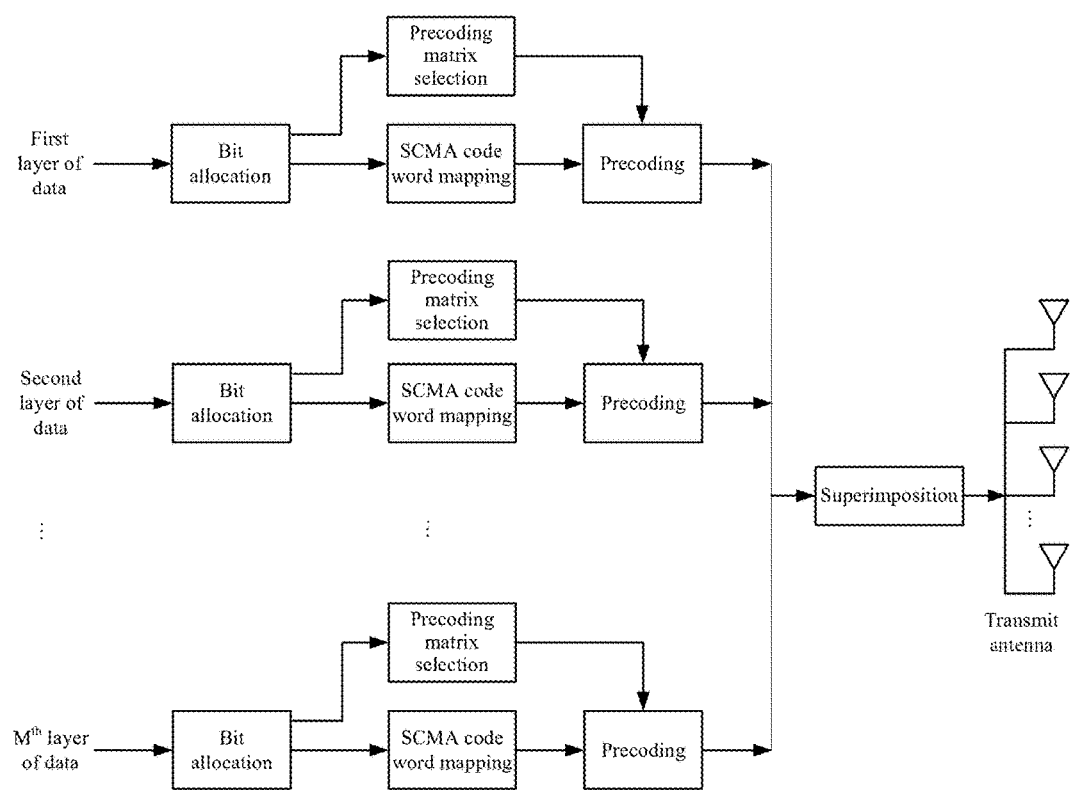
FIG. 10 is a schematic flowchart of data processing performed by a transmit end device according to an embodiment of the present invention.
Figure 11:
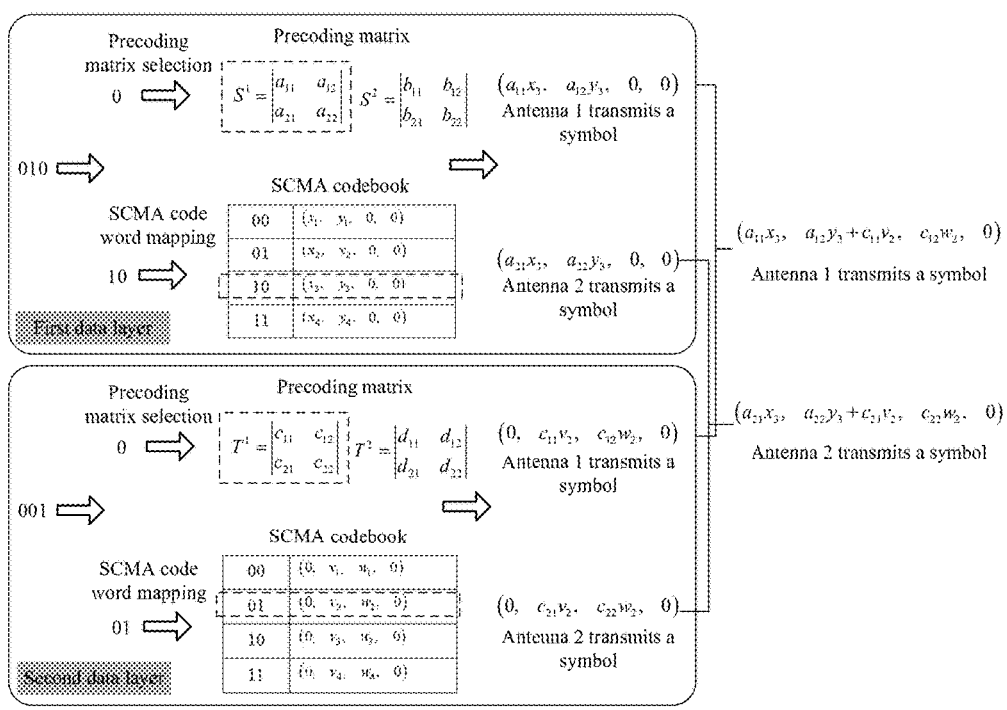
FIG. 11 is a schematic diagram of a data transmission method according to an embodiment of the present invention.

Specifically, when there are multiple data layers, modulation symbol matrices corresponding to data bits at the layers are obtained, and then, superimposition processing is performed on modulation symbol matrices corresponding to $K_m$ consecutive bits at the layers. FIG. 10 is a schematic flowchart of data processing performed by a transmit end device according to a method 200 in an embodiment of the present invention. As shown in FIG. 10, after obtaining to-be-transmitted data bits at each layer, the transmit end device first allocates the data bits. For a data bit group at each layer, a target SCMA code word corresponding to $K_{m,1}$ bits is selected from multiple SCMA codebooks according to the $K_{m,1}$ bits of the data bit group at each layer (that is, bit mapping processing is performed to generate a modulation symbol). A precoding matrix corresponding to $K_{m,2}$ bits is selected from multiple preset precoding matrices according to the $K_{m,2}$ bits of the data bit group at each layer. Then, the modulation symbol obtained by means of mapping is precoded according to the selected precoding matrix, to obtain a modulation symbol matrix corresponding to the data bit group at each layer, superimposition processing is performed on modulation symbol matrices at the layers, and each row in the superimposed modulation symbol matrices is transmitted by using a corresponding transmit antenna.

It should be understood that when there are multiple data layers, $K_m$, $K_{m,1}$, and $K_{m,2}$ are respectively a quantity of data bits of a data bit group at the $m^{th}$ layer, a quantity of data bits, of $K_m$ bits, used to map modulation symbols, and a quantity of data bits, of the $K_m$ bits, used to determine a precoding matrix, respectively. $K_m$ is an integer greater than 2, and $K_{m,1}$ and $K_{m,2}$ are integers greater than 0 and less than $K_m$. In addition, preferably, $K_{m,1}$ bits and $K_{m,2}$ bits are bits at different locations, of the $K_m$ contiguous bits, and $K_{m,1}$+$K_{m,2}$=$K_m$.

It should further be understood that multiple preset precoding matrices at each layer of the multiple data layers may be the same or different. A quantity of rows in each precoding matrix is equal to a quantity of transmit antennas, and a quantity of columns is equal to a quantity of symbols in code words. A different codebook is used at each layer of the multiple data layers. A modulation symbol matrix obtained at each of the multiple data layers should have a same quantity of rows, and also should have a same quantity of columns. Correspondingly, a quantity of rows in the first modulation symbol matrix is equal to a quantity of rows in a second modulation symbol matrix, and a quantity of columns in the first modulation symbol matrix is equal to a quantity of columns in the second modulation symbol matrix.

Therefore, according to the data transmission method in this embodiment of the present invention, one part of bits of a data bit group are mapped to modulation symbols, the other part of bits are used to determine a precoding matrix, and precoding processing is performed on the modulation symbols according to the precoding matrix, to obtain a modulation symbol matrix, so that data bits after being precoded can be corresponding to multiple antennas, and a problem of low transmission reliability in spatial modulation can be resolved. In addition, data at multiple data layers can be transmitted at the same time, and transmission efficiency can be improved.

A multiple-layer data transmission method in this embodiment of the present invention is described in detail by using a detailed example in the following.

FIG. ii shows a spatial modulation scheme in which there are two data layers and two transmit antennas, and an SCMA code word length is 4 (with two non-zero symbols).

The multiple preset precoding matrices at a first data layer include:

$$S^1 = \begin{vmatrix} a_{11} & a_{12} \\ a_{21} & a_{22} \end{vmatrix}, \text{ and } S^2 = \begin{vmatrix} b_{11} & b_{12} \\ b_{21} & b_{22} \end{vmatrix} \cdot S^1 = \begin{vmatrix} a_{11} & a_{12} \\ a_{21} & a_{22} \end{vmatrix}$$

is corresponding to a bit 0, and $$S^2 = \begin{vmatrix} b_{11} & b_{12} \\ b_{21} & b_{22} \end{vmatrix}$$

is corresponding to a bit 1. An SCMA codebook corresponding to the first data layer is shown in Table 6. When a first data bit group at the first data layer is 010, the first bit 0 is corresponding to the first precoding matrix $$S^1 = \begin{vmatrix} a_{11} & a_{12} \\ a_{21} & a_{22} \end{vmatrix},$$

and the first modulation symbol (a first code word) corresponding to the second and third bits 10 is $(X_3, y_3, 0, 0)$.

TABLE 6

| | |
|---|---|
| 00 | $(x_1, y_1, 0, 0)$ |
| 01 | $(x_2, y_2, 0, 0)$ |
| 10 | $(x_3, y_3, 0, 0)$ |
| 11 | $(x_4, y_4, 0, 0)$ |

The first modulation symbol $(x_3\ y_3\ 0\ 0)$ at the first data layer is precoded according to the first precoding matrix:

$$S^1 = \begin{vmatrix} a_{11} & a_{12} \\ a_{21} & a_{22} \end{vmatrix},$$

at the first data layer, to obtain the first modulation symbol matrix corresponding to the first data bit group 010 at the first data layer. Specifically, the first row of elements in the first precoding matrix is multiplied by a non-zero symbol of the first modulation symbol, to obtain a non-zero element in the first row in the first modulation symbol matrix. Then, a 0 is padded as an element in the first row in the first modulation symbol matrix according to a location of a zero symbol of the first modulation symbol. An operation similar to that on the first row is performed on the second row, to obtain that the first modulation symbol matrix corresponding to the first data bit group 010 is $$\begin{pmatrix} a_{11}x_3 & a_{12}y_3 & 0 & 0 \\ a_{21}x_3 & a_{22}y_3 & 0 & 0 \end{pmatrix}.$$

A number of an antenna corresponding to the first row in the first modulation symbol matrix is 1, and therefore, the antenna 1 is corresponding to a symbol $(a_{11}x_3, a_{12}y_3, 0, 0)$. A number of an antenna corresponding to the second row in the first modulation symbol matrix is 2, and therefore, the antenna 2 is corresponding to a symbol $(a_{21}x_3, a_{22}y_3, 0, 0)$.

The multiple preset precoding matrices at a second data layer include:

$$T^1 = \begin{vmatrix} c_{11} & c_{12} \\ c_{21} & c_{22} \end{vmatrix}, \text{ and } T^2 = \begin{vmatrix} d_{11} & d_{12} \\ d_{21} & d_{22} \end{vmatrix} \cdot T^1 = \begin{vmatrix} c_{11} & c_{12} \\ c_{21} & c_{22} \end{vmatrix}$$

is corresponding to a bit 0, and $$T^2 = \begin{vmatrix} d_{11} & d_{12} \\ d_{21} & d_{22} \end{vmatrix}$$

is corresponding to a bit 1. An SCMA codebook corresponding to the second data layer is shown in Table 7. When a second data bit group at the second data layer is 001, the first bit 0 is corresponding to the second precoding matrix:

$$T^1 = \begin{vmatrix} c_{11} & c_{12} \\ c_{21} & c_{22} \end{vmatrix},$$

and the second modulation symbol (a second code word) corresponding to the second and third bits 01 is (0, $v_2$, $w_2$, 0).

TABLE 7

| | |
|---|---|
| 00 | (0, $v_1$, $w_1$, 0) |
| 01 | (0, $v_2$, $w_2$, 0) |
| 10 | (0, $v_3$, $w_3$, 0) |
| 11 | (0, $v_4$, $w_4$, 0) |

The second modulation symbol (0, $v_2$, $w_2$, 0) at the second data layer is precoded according to the second precoding matrix:

$$T^1 = \begin{vmatrix} c_{11} & c_{12} \\ c_{21} & c_{22} \end{vmatrix},$$

at the second data layer, to obtain the second modulation symbol matrix corresponding to the second data bit group 001 at the second data layer. Specifically, the first row of elements in the second precoding matrix is multiplied by a non-zero symbol of the second modulation symbol, to obtain a non-zero element in the first row in the second modulation symbol matrix. Then, a 0 is padded as an element in the first row in the second modulation symbol matrix according to a location of a zero symbol of the second modulation symbol. An operation similar to that on the first row is performed on the second row, to obtain that the second modulation symbol matrix corresponding to the second data bit group 001 is $$\begin{pmatrix} 0 & c_{11}v_2 & c_{12}w_2 & 0 \\ 0 & c_{21}v_2 & c_{22}w_2 & 0 \end{pmatrix}.$$

A number of an antenna corresponding to the first row in the second modulation symbol matrix is 1, and therefore, the antenna 1 is corresponding to a symbol (0, $c_{11}v_2$, $c_{12}w_2$, 0). A number of an antenna corresponding to the second row in the second modulation symbol matrix is 2, and therefore, the antenna 2 is corresponding to a symbol (0, $c_{21}v_2$, $c_{22}w_2$, 0).

Superimposition processing is performed on the first modulation symbol matrix:

$$\begin{pmatrix} a_{11}x_3 & a_{12}y_3 & 0 & 0 \\ a_{21}x_3 & a_{22}y_3 & 0 & 0 \end{pmatrix},$$

and the second modulation symbol matrix:

$$\begin{pmatrix} 0 & c_{11}v_2 & c_{12}w_2 & 0 \\ 0 & c_{21}v_2 & c_{22}w_2 & 0 \end{pmatrix},$$

so that a final modulation symbol matrix:

$$\begin{pmatrix} a_{11}x_3 & a_{12}y_3+c_{11}v_2 & c_{12}w_2 & 0 \\ a_{21}x_3 & a_{22}y_3+c_{21}v_2 & c_{22}w_2 & 0 \end{pmatrix}$$

can be obtained. A number of an antenna corresponding to the first row in the final modulation symbol matrix is 1, and therefore, the antenna 1 transmits a symbol ($a_{11}x_3$, $a_{12}y_3+c_{11}v_2$, $c_{12}w_2$, 0). A number of an antenna corresponding to the second row in the final modulation symbol matrix is 2, and therefore, the antenna 2 transmits a symbol ($a_{21}x_3$, $a_{22}y_3+c_{21}v_2$, $c_{22}w_2$, 0).

The data transmission method in this embodiment of the present invention is described in detail from the perspective of a transmit end device with reference to FIG. 2 to FIG. 11 in the foregoing. A data transmission method in an embodiment of the present invention is further described from the perspective of a receive end device with reference to FIG. 12 and FIG. 13 in the following.

FIG. 12 is a schematic flowchart of a data transmission method 300 according to an embodiment of the present invention. As shown in FIG. 12, the method 300 may be executed by a receive end device and includes:

S310. Receive a first modulation symbol matrix transmitted by a transmit end device, where the first modulation symbol matrix is generated by the transmit end device after the transmit end device performs precoding processing on a first modulation symbol according to a first precoding matrix of multiple preset precoding matrices, the first modulation symbol is generated by the transmit end device after the transmit end device performs bit mapping processing on a first part of bits of a first data bit group, the first precoding matrix is corresponding to a second part of bits of the first data bit group, and the first precoding matrix is corresponding to at least two antennas of N antennas included by the transmit end device, the first data bit group includes at least two bits, the first part of bits includes at least one bit, and the second part of bits is a bit of the first data bit group other than the first part of bits.

S320. Perform, according to the first modulation symbol matrix, channel estimation on a channel corresponding to each precoding matrix, to determine the first data bit group.

Preferably, the first modulation symbol includes at least one non-zero modulation symbol and at least one zero modulation symbol. The method 300 is applied to an SCMA technology. Certainly, the method 300 may also be applied to an LDS code word, a CDMA code word, or the like.

Optionally, the receive end device is a network device, or the receive end device is a terminal device.

Therefore, according to the data transmission method in this embodiment of the present invention, channel estimation is performed, according to a received first modulation symbol matrix, on a channel corresponding to each precoding matrix, to determine a first data bit group corresponding to the first modulation symbol matrix, and obtain user data, so that a modulation symbol matrix sent by a transmit end device in this embodiment of the present invention can be decoded, and a problem of low transmission reliability in spatial modulation can be resolved.

Optionally, in an embodiment, the performing, according to the first modulation symbol matrix, channel estimation on a channel corresponding to each precoding matrix, to determine the first data bit group includes: performing, according to the first modulation symbol matrix, channel estimation on the channel corresponding to each precoding matrix, to determine channel gains of channels corresponding to the multiple precoding matrices; decoding the first modulation symbol matrix according to the channel gains, to obtain log-likelihood values corresponding to all combinations of modulation symbols and precoding matrices; and decoding a combination, whose log-likelihood value is the largest, of a modulation symbol and a precoding matrix, to determine the first data bit group.

Specifically, as shown in FIG. 13, using an SCMA code word as an example, first, different SCMA code words may be corresponding to different precoding matrices, channel gains corresponding to all possible precoding matrices need to be estimated; and the channel gains of the channels corresponding to the multiple precoding matrices are determined by performing channel estimation on the channel corresponding to each precoding matrix. Then, the first modulation symbol matrix is decoded according to the channel gains, to obtain log-likelihood values corresponding to all combinations of modulation symbols and the precoding matrices. Finally, a combination, whose log-likelihood value is the largest, of a modulation symbol and a precoding matrix is decoded, to determine the first data bit group.

Optionally, in an embodiment, before the decoding a combination, whose log-likelihood value is the largest, of a modulation symbol and a precoding matrix, to determine the first data bit group, the method 300 further includes: obtaining prior information of the first data bit group; and the decoding a combination, whose log-likelihood value is the largest, of a modulation symbol and a precoding matrix, to determine the first data bit group in S320 includes: decoding, according to the prior information, the combination, whose log-likelihood value is the largest, of a modulation symbol and a precoding matrix, to determine the first data bit group.

Therefore, according to the data transmission method in this embodiment of the present invention, iterative decoding is performed by using feedback prior information, so that performance of a receive end device can be improved.

Optionally, in an embodiment, the bit mapping processing is to map bits by using a code word. The code word is a multidimensional complex number vector and is used to represent a mapping relationship between bits and at least two modulation symbols, and the at least two modulation symbols include at least one non-zero modulation symbol and at least one zero modulation symbol.

Optionally, in an embodiment, the method 300 further includes: receiving at least one second modulation symbol matrix transmitted by the transmit end device, where the second modulation symbol matrix is generated by the transmit end device after the transmit end device performs precoding processing on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, the second precoding matrix is corresponding to at least two antennas of the N antennas included by the transmit end device, and superimposition processing is performed on the first modulation symbol matrix and the at least one second modulation symbol matrix by the transmit end device; and the performing, according to the first modulation symbol matrix, channel estimation on a channel corresponding to each precoding matrix, to determine the first data bit group in S320 includes: performing, according to the first modulation symbol matrix and the at least one second modulation symbol matrix, channel estimation on the channel corresponding to each precoding matrix, to determine the first data bit group and at least one second data bit group.

Optionally, in an embodiment, the second modulation symbol includes at least one non-zero modulation symbol and at least one zero modulation symbol.

Therefore, according to the data transmission method in this embodiment of the present invention, channel estimation is performed, according to a received first modulation symbol matrix, on a channel corresponding to each precoding matrix, to determine a first data bit group corresponding to the first modulation symbol matrix, and obtain user data, so that a modulation symbol matrix sent by a transmit end device in this embodiment of the present invention can be decoded, and a problem of low transmission reliability in spatial modulation can be resolved.

The data transmission method in the embodiments of the present invention is described in detail with reference to FIG. 1 to FIG. 13 in the foregoing. A transmit end device and a receive end device in the embodiments of the present invention are described in detail with reference to FIG. 14 to FIG. 17 in the following.

Figure 14:
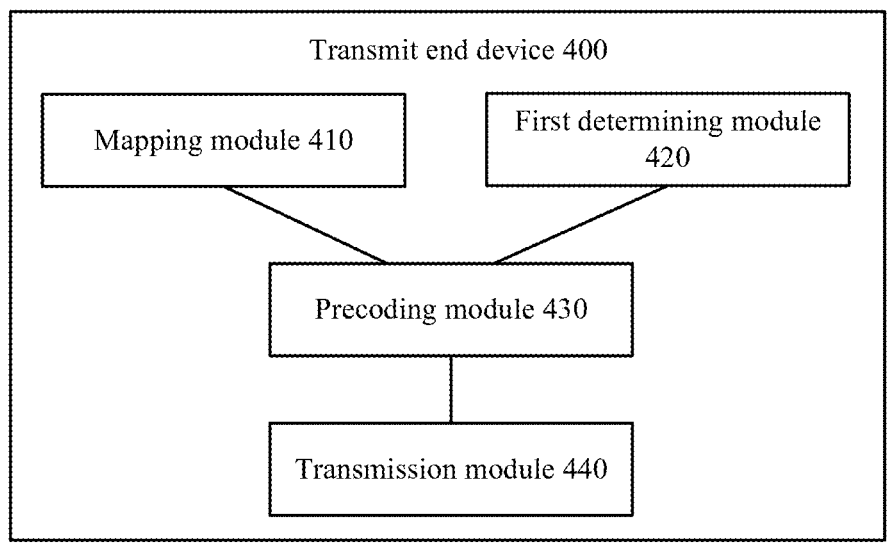
FIG. 14 is a schematic block diagram of a transmit end device according to an embodiment of the present invention.

FIG. 14 is a schematic block diagram of a transmit end device 400 according to an embodiment of the present invention. The transmit end device 400 includes N antennas, and N≥2. As shown in FIG. 14, the transmit end device 400 includes: a mapping module 410, configured to perform bit mapping processing on a first part of bits of a first data bit group, to generate a first modulation symbol, where the first data bit group includes at least two bits, and the first part of bits includes at least one bit; a first determining module 420, configured to determine a first precoding matrix from multiple preset precoding matrices according to a second part of bits of the first data bit group, where the first precoding matrix is corresponding to at least two antennas of the N antennas, and the second part of bits is a bit of the first data bit group other than the first part of bits; a precoding module 430, configured to perform, according to the first precoding matrix determined by the first determining module 420, precoding processing on the first modulation symbol obtained by the mapping module 410, to obtain a first modulation symbol matrix; and a transmission module 440, configured to transmit, to a receive end device by using the at least two antennas, the first modulation symbol matrix obtained after the precoding module 430 performs precoding processing.

Therefore, according to the transmit end device in this embodiment of the present invention, one part of bits of a data bit group are mapped to modulation symbols, the other part of bits are used to determine a precoding matrix, and precoding processing is performed on the modulation symbols according to the precoding matrix, to obtain a modulation symbol matrix, so that data bits after being precoded can be corresponding to multiple antennas, and a problem of low transmission reliability in spatial modulation can be resolved.

Optionally, in an embodiment, the first precoding matrix includes R rows and C columns. R is corresponding to a quantity of the at least two antennas, and C is corresponding to a quantity of non-zero symbols of the first modulation symbol.

Optionally, in an embodiment, the transmission module 440 is specifically configured to: perform superimposition processing on the first modulation symbol matrix and at least one second modulation symbol matrix, where the second modulation symbol matrix is generated after precoding processing is performed on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, and the second precoding matrix is corresponding to at least two antennas of the N antennas; and transmit the first modulation symbol matrix obtained after the superimposition processing to the receive end device by using the at least two antennas.

Optionally, in an embodiment, a quantity of rows in the first modulation symbol matrix and a quantity of rows in the second modulation symbol matrix are equal, and a quantity of columns in the first modulation symbol matrix and a quantity of columns in the second modulation symbol matrix are equal.

Optionally, in an embodiment, an element of the precoding matrix is 0 or 1.

Optionally, in an embodiment, the bit mapping processing performed by the mapping module 410 is to map bits by using a code word. The code word is a multidimensional complex number vector and is used to represent a mapping relationship between bits and at least two modulation symbols, and the at least two modulation symbols include at least one non-zero modulation symbol and at least one zero modulation symbol.

Optionally, in an embodiment, the first modulation symbol includes at least one non-zero modulation symbol and at least one zero modulation symbol.

Optionally, in an embodiment, the second modulation symbol includes at least one non-zero modulation symbol and at least one zero modulation symbol.

Optionally, in an embodiment, the transmit end device 400 is a network device, or the transmit end device 400 is a terminal device.

Therefore, according to the transmit end device in this embodiment of the present invention, one part of bits of a data bit group are mapped to modulation symbols, the other part of bits are used to determine a precoding matrix, and precoding processing is performed on the modulation symbols according to the precoding matrix, to obtain a modulation symbol matrix, so that data bits after being precoded can be corresponding to multiple antennas, and a problem of low transmission reliability in spatial modulation can be resolved.

Figure 15:
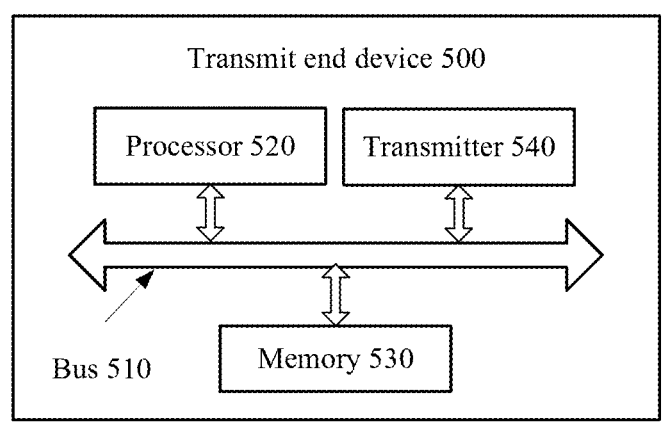
FIG. 15 is a schematic block diagram of a transmit end device according to an embodiment of the present invention.

As shown in FIG. 15, an embodiment of the present invention further provides a transmit end device 500. The transmit end device 500 includes a bus 510, a processor 520, a memory 530, and a transmitter 540. The processor 520, the memory 530, and the transmitter 540 are connected by using the bus 510. The processor 520 invokes, by using the bus 510, a program stored in the memory 530, to: perform bit mapping processing on a first part of bits of a first data bit group, to generate a first modulation symbol, where the first data bit group includes at least two bits, and the first part of bits includes at least one bit; determine a first precoding matrix from multiple preset precoding matrices according to a second part of bits of the first data bit group, where the first precoding matrix is corresponding to at least two antennas of the N antennas, and the second part of bits is a bit of the first data bit group other than the first part of bits; and perform precoding processing on the first modulation symbol according to the first precoding matrix, to obtain a first modulation symbol matrix; and the transmitter 540 invokes, by using the bus 510, a program stored in the memory 530, to transmit the first modulation symbol matrix to a receive end device by using the at least two antennas.

Therefore, according to the transmit end device in this embodiment of the present invention, one part of bits of a data bit group are mapped to modulation symbols, the other part of bits are used to determine a precoding matrix, and precoding processing is performed on the modulation symbols according to the precoding matrix, to obtain a modulation symbol matrix, so that data bits after being precoded can be corresponding to multiple antennas, and a problem of low transmission reliability in spatial modulation can be resolved.

It should be understood that in this embodiment of the present invention, the processor 520 may be a central processing unit (Central Processing Unit, CPU). Alternatively, the processor 520 may be another general-purpose processor, a digital signal processor (Digital Signal Processor, DSP), an application specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general-purpose processor may be a microprocessor, or the processor may be any conventional processor, or the like.

The memory 530 may include a read-only memory and a random access memory, and provides an instruction and data for the processor 520. A part of the memory 530 may further include a nonvolatile random access memory. For example, the memory 530 may further store information about a device type.

The bus 510 may include a data bus, and may additionally include a power bus, a control bus, a status signal bus, or the like. However, for clear description, various buses are labeled as the bus 510 in the figure.

During an implementation process, steps in the foregoing methods may be completed by a hardware integrated logic circuit in the processor 520 or an instruction in form of software. Steps of the methods disclosed with reference to the embodiments of the present invention may be directly embodied as: the steps are performed by a hardware processor or by a hardware-and-software module combination in a processor. A software module may be located in a random access memory, a flash memory, a read-only memory, a programmable read-only memory or an electrically erasable programmable memory, a register, or another mature storage medium in the art. The storage medium is located in the memory 530. The processor 520 reads information from the memory 530 and completes steps of the foregoing methods in combination with hardware of the processor 520. To avoid repetition, details are not described herein again.

Optionally, in an embodiment, the first precoding matrix includes R rows and C columns. R is corresponding to a quantity of the at least two antennas, and C is corresponding to a quantity of non-zero symbols of the first modulation symbol.

Optionally, in an embodiment, the transmitter 540 is specifically configured to: perform superimposition processing on the first modulation symbol matrix and at least one second modulation symbol matrix, where the second modulation symbol matrix is generated after precoding processing is performed on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, and the second precoding matrix is corresponding to at least two antennas of the N antennas; and transmit the first modulation symbol matrix obtained after the superimposition processing to the receive end device by using the at least two antennas.

Optionally, in an embodiment, a quantity of rows in the first modulation symbol matrix and a quantity of rows in the second modulation symbol matrix are equal, and a quantity of columns in the first modulation symbol matrix and a quantity of columns in the second modulation symbol matrix are equal.

Optionally, in an embodiment, an element of the precoding matrix is 0 or 1.

Optionally, in an embodiment, the bit mapping processing performed by the processor 520 is to map bits by using a code word, the code word is a multidimensional complex number vector and is used to represent a mapping relationship between bits and at least two modulation symbols, and the at least two modulation symbols include at least one non-zero modulation symbol and at least one zero modulation symbol.

Optionally, in an embodiment, the first modulation symbol includes at least one non-zero modulation symbol and at least one zero modulation symbol.

Optionally, in an embodiment, the second modulation symbol includes at least one non-zero modulation symbol and at least one zero modulation symbol.

Optionally, in an embodiment, the transmit end device 500 is a network device, or the transmit end device 500 is a terminal device.

It should be understood that the transmit end device 500 in this embodiment of the present invention may be corresponding to an entity executing the methods in the embodiments of the present invention, or may be corresponding to the transmit end device 400 according to the embodiment of the present invention. In addition, the foregoing and other operations and/or functions of modules in the transmit end device 400 are to implement corresponding processes in the methods in FIG. 2 to FIG. 13. For brevity, details are not described herein again.

Therefore, according to the transmit end device in this embodiment of the present invention, one part of bits of a data bit group are mapped to modulation symbols, the other part of bits are used to determine a precoding matrix, and precoding processing is performed on the modulation symbols according to the precoding matrix, to obtain a modulation symbol matrix, so that data bits after being precoded can be corresponding to multiple antennas, and a problem of low transmission reliability in spatial modulation can be resolved.

Figure 16:
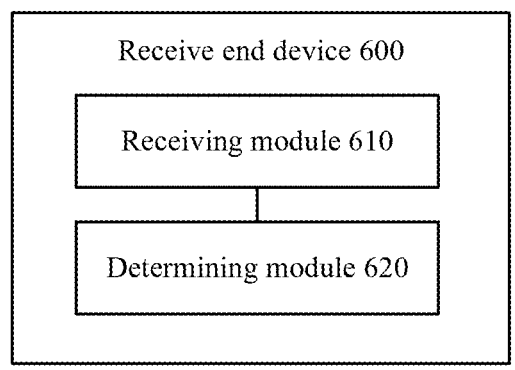
FIG. 16 is a schematic block diagram of a receive end device according to an embodiment of the present invention.

FIG. 16 shows a schematic block diagram of a receive end device 600 according to an embodiment of the present invention. As shown in FIG. 16, the receive end device 600 includes: a receiving module 610, configured to receive a first modulation symbol matrix transmitted by a transmit end device, where the first modulation symbol matrix is generated by the transmit end device after the transmit end device performs precoding processing on a first modulation symbol according to a first precoding matrix of multiple preset precoding matrices, the first modulation symbol is generated by the transmit end device after the transmit end device performs bit mapping processing on a first part of bits of a first data bit group, the first precoding matrix is corresponding to a second part of bits of the first data bit group, and the first precoding matrix is corresponding to at least two antennas of N antennas included by the transmit end device, the first data bit group includes at least two bits, the first part of bits includes at least one bit, and the second part of bits is a bit of the first data bit group other than the first part of bits; and a determining module 620, configured to perform, according to the first modulation symbol matrix received by the receiving module 610, channel estimation on a channel corresponding to each precoding matrix, to determine the first data bit group.

Therefore, according to the receive end device in this embodiment of the present invention, channel estimation is performed, according to a received first modulation symbol matrix, on a channel corresponding to each precoding matrix, to determine a first data bit group corresponding to the first modulation symbol matrix, and obtain user data, so that a modulation symbol matrix sent by a transmit end device in this embodiment of the present invention can be decoded, and a problem of low transmission reliability in spatial modulation can be resolved.

Optionally, in an embodiment, the determining module 620 is specifically configured to: perform, according to the first modulation symbol matrix, channel estimation on the channel corresponding to each precoding matrix, to determine channel gains of channels corresponding to the multiple precoding matrices; decode the first modulation symbol matrix according to the channel gains, to obtain log-likelihood values corresponding to all combinations of modulation symbols and precoding matrices; and decode a combination, whose log-likelihood value is the largest, of a modulation symbol and a precoding matrix, to determine the first data bit group.

Optionally, in an embodiment, the receive end device 600 further includes: an obtaining module, configured to obtain prior information of the first data bit group, before the determining module decodes the combination, whose log-likelihood value is the largest, of a modulation symbol and a precoding matrix to determine the first data bit group; and the determining module 620 is specifically configured to: decode, according to the prior information, the combination, whose log-likelihood value is the largest, of a modulation symbol and a precoding matrix, to determine the first data bit group.

Therefore, according to the receive end device in this embodiment of the present invention, iterative decoding is performed by using feedback prior information, so that performance of a receive device can be improved.

Optionally, in an embodiment, the receiving module 610 is further configured to: receive at least one second modulation symbol matrix transmitted by the transmit end device, where the second modulation symbol matrix is generated by the transmit end device after the transmit end device performs precoding processing on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, the second precoding matrix is corresponding to at least two antennas of the N antennas included by the transmit end device, and superimposition processing is performed on the first modulation symbol matrix and the at least one second modulation symbol matrix by the transmit end device; and the determining module 620 is specifically configured to: perform, according to the first modulation symbol matrix and the at least one second modulation symbol matrix, channel estimation on the channel corresponding to each precoding matrix, to determine the first data bit group and at least one second data bit group.

Optionally, in an embodiment, the first modulation symbol includes at least one non-zero modulation symbol and at least one zero modulation symbol.

Optionally, in an embodiment, the second modulation symbol includes at least one non-zero modulation symbol and at least one zero modulation symbol.

Optionally, in an embodiment, the receive end device 600 is a network device, or the receive end device 600 is a terminal device.

Therefore, according to the receive end device in this embodiment of the present invention, channel estimation is performed, according to a received first modulation symbol matrix, on a channel corresponding to each precoding matrix, to determine a first data bit group corresponding to the first modulation symbol matrix, and obtain user data, so that a modulation symbol matrix sent by a transmit end device in this embodiment of the present invention can be decoded, and a problem of low transmission reliability in spatial modulation can be resolved.

Figure 17:
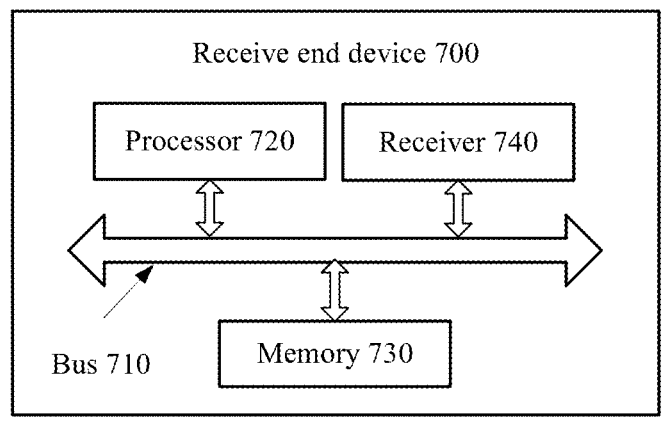
FIG. 17 is a schematic block diagram of a receive end device according to an embodiment of the present invention.

As shown in FIG. 17, an embodiment of the present invention further provides a receive end device 700. The receive end device 700 includes a bus 710, a processor 720 connected to the bus 710, a memory 730 connected to the bus 710, and a receiver 740 connected to the bus 710. The processor 720, the memory 730, and the receiver 740 are connected by using the bus 710. The memory 730 is configured to store an instruction. The processor 720 is configured to execute the instruction stored in the memory 730. The receiver 740 invokes, by using the bus 710, a program stored in the memory 730, to: receive a first modulation symbol matrix transmitted by a transmit end device, where the first modulation symbol matrix is generated by the transmit end device after the transmit end device performs precoding processing on a first modulation symbol according to a first precoding matrix of multiple preset precoding matrices, the first modulation symbol is generated by the transmit end device after the transmit end device performs bit mapping processing on a first part of bits of a first data bit group, the first precoding matrix is corresponding to a second part of bits of the first data bit group, and the first precoding matrix is corresponding to at least two antennas of N antennas included by the transmit end device, the first data bit group includes at least two bits, the first part of bits includes at least one bit, and the second part of bits is a bit of the first data bit group other than the first part of bits.

The processor 720 invokes, by using the bus 710, the program stored in the memory 730, to: perform, according to the first modulation symbol matrix, channel estimation on a channel corresponding to each precoding matrix, to determine the first data bit group.

Therefore, according to the receive end device in this embodiment of the present invention, channel estimation is performed, according to a received first modulation symbol matrix, on a channel corresponding to each precoding matrix, to determine a first data bit group corresponding to the first modulation symbol matrix, and obtain user data, so that a modulation symbol matrix sent by a transmit end device in this embodiment of the present invention can be decoded, and a problem of low transmission reliability in spatial modulation can be resolved.

It should be understood that in this embodiment of the present invention, the processor 720 may be a central processing unit (Central Processing Unit, CPU). Alternatively, the processor 720 may be another general-purpose processor, a digital signal processor (Digital Signal Processor, DSP), an application specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general-purpose processor may be a microprocessor, or the processor may be any conventional processor, or the like.

The memory 730 may include a read-only memory and a random access memory, and provides an instruction and data for the processor 720. A part of the memory 730 may further include a nonvolatile random access memory. For example, the memory 730 may further store information about a device type.

The bus 710 may include a data bus, and may additionally include a power bus, a control bus, a status signal bus, or the like. However, for clear description, various buses are labeled as the bus 710 in the figure.

During an implementation process, steps in the foregoing methods may be completed by a hardware integrated logic circuit in the processor 720 or an instruction in form of software. Steps of the methods disclosed with reference to the embodiments of the present invention may be directly embodied as: the steps are performed by a hardware processor or by a hardware-and-software module combination in a processor. A software module may be located in a random access memory, a flash memory, a read-only memory, a programmable read-only memory or an electrically erasable programmable memory, a register, or another mature storage medium in the art. The storage medium is located in the memory 730. The processor 720 reads information from the memory 730 and completes steps of the foregoing methods in combination with hardware of the processor 720. To avoid repetition, details are not described herein again.

Optionally, in an embodiment, the processor 720 is specifically configured to: perform, according to the first modulation symbol matrix, channel estimation on the channel corresponding to each precoding matrix, to determine channel gains of channels corresponding to the multiple precoding matrices; decode the first modulation symbol matrix according to the channel gains, to obtain log-likelihood values corresponding to all combinations of modulation symbols and precoding matrices; and decode a combination, whose log-likelihood value is the largest, of a modulation symbol and a precoding matrix, to determine the first data bit group.

Optionally, in an embodiment, the receiver 740 is further configured to: obtain prior information of the first data bit group; and that the processor 720 decodes the combination, whose log-likelihood value is the largest, of a modulation symbol and a precoding matrix, to determine the first data bit group includes: decoding, according to the prior information, the combination, whose log-likelihood value is the largest, of a modulation symbol and a precoding matrix, to determine the first data bit group.

Therefore, according to the receive end device in this embodiment of the present invention, iterative decoding is performed by using feedback prior information, so that performance of a receive end device can be improved.

Optionally, in an embodiment, the receiver 740 is further configured to: receive at least one second modulation symbol matrix transmitted by the transmit end device, where the second modulation symbol matrix is generated by the transmit end device after the transmit end device performs precoding processing on a second modulation symbol according to a second precoding matrix, the second modulation symbol is generated by means of bit mapping processing performed on a third part of bits of a second data bit group, the second precoding matrix is determined according to a fourth part of bits of the second data bit group, the second data bit group includes at least two bits, the third part of bits includes at least one bit, the fourth part of bits is a bit of the second data bit group other than the third part of bits, the second precoding matrix is corresponding to at least two antennas of the N antennas included by the transmit end device, and superimposition processing is performed on the first modulation symbol matrix and the at least one second modulation symbol matrix by the transmit end device; and that the processor 720 performs, according to the first modulation symbol matrix, channel estimation on the channel corresponding to each precoding matrix, to determine the first data bit group includes: performing, according to the first modulation symbol matrix and the at least one second modulation symbol matrix, channel estimation on the channel corresponding to each precoding matrix, to determine the first data bit group and at least one second data bit group.

Optionally, in an embodiment, the second modulation symbol includes at least one non-zero modulation symbol and at least one zero modulation symbol.

Optionally, in an embodiment, the receive end device 700 is a network device, or the receive end device 700 is a terminal device.

It should be understood that the receive end device 700 in this embodiment of the present invention may be corresponding to an entity executing the methods in the embodiments of the present invention, or may be corresponding to the receive end device 600 according to the embodiment of the present invention. In addition, the foregoing and other operations and/or functions of modules in the receive end device 700 are to implement corresponding processes in the methods in FIG. 2 to FIG. 13. For brevity, details are not described herein again.

Therefore, according to the receive end device in this embodiment of the present invention, channel estimation is performed, according to a received first modulation symbol matrix, on a channel corresponding to each precoding matrix, to determine a first data bit group corresponding to the first modulation symbol matrix, and obtain user data, so that a modulation symbol matrix sent by a transmit end device in this embodiment of the present invention can be decoded, and a problem of low transmission reliability in spatial modulation can be resolved.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present embodiments. Any modification or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A transmit end device, comprising:
   N antennas, wherein N≥2;
   a processor coupled to the N antennas; and
   a non-transitory computer readable storage medium storing a program for execution by the processor, the program including instructions to:
   perform bit mapping processing on a first portion of bits of a first data bit group, to generate a first modulation symbol, wherein the first data bit group comprises at least two bits, and wherein the first portion of bits comprises at least one bit;
   determine a first precoding matrix from multiple preset precoding matrices according to a second portion of bits of the first data bit group, wherein the first precoding matrix corresponds to at least two antennas of the N antennas, and wherein the second portion of bits is a bit of the first data bit group other than the first portion of bits;
   perform precoding processing on the first modulation symbol according to the first precoding matrix, to obtain a first modulation symbol matrix; and
   transmit the first modulation symbol matrix to a receive end device by using the at least two antennas.

2. The transmit end device according to claim 1, wherein the first precoding matrix comprises R rows and C columns, wherein R corresponds to a quantity of the at least two antennas, and wherein C corresponds to a quantity of non-zero symbols of the first modulation symbol.

3. The transmit end device according to claim 1, wherein the instructions further comprise instructions to:
   perform superimposition processing on the first modulation symbol matrix and at least one second modulation symbol matrix, wherein the second modulation symbol matrix is generated after precoding processing is performed on a second modulation symbol according to a second precoding matrix, wherein the second modulation symbol is generated by bit mapping processing performed on a third portion of bits of a second data bit group, wherein the second precoding matrix is determined according to a fourth portion of bits of the second data bit group, wherein the second data bit group comprises at least two bits, wherein the third portion of bits comprises at least one bit, wherein the fourth portion of bits is a bit of the second data bit group other than the third portion of bits, and wherein the second precoding matrix corresponds to at least two antennas of the N antennas; and
   transmit the first modulation symbol matrix obtained after the superimposition processing to the receive end device using the at least two antennas.

4. The transmit end device according to claim 3, wherein a quantity of rows in the first modulation symbol matrix and a quantity of rows in the second modulation symbol matrix are equal, and wherein a quantity of columns in the first modulation symbol matrix and a quantity of columns in the second modulation symbol matrix are equal.

5. The transmit end device according to claim 3, wherein the first modulation symbol comprises at least one non-zero modulation symbol and at least one zero modulation symbol.

6. The transmit end device according to claim 3, wherein the second modulation symbol comprises at least one non-zero modulation symbol and at least one zero modulation symbol.

7. The transmit end device according to claim 1, wherein an element of the first precoding matrix is 0 or 1.

8. The transmit end device according to claim 1, wherein the instructions to perform bit mapping processing comprise instructions to map bits using a code word, wherein the code word is a multidimensional complex number vector representing a mapping relationship between bits and at least two modulation symbols, and wherein the at least two modulation symbols comprise at least one non-zero modulation symbol and at least one zero modulation symbol.

9. The transmit end device according to claim 1, wherein the transmit end device is a network device.

10. The transmit end device according to claim 1, wherein the transmit end device is a terminal device.

11. A receive end device, wherein the receive end device comprises:
    a processor; and
    a non-transitory computer readable storage medium storing a program for execution by the processor, the program including instructions to:
    receive a first modulation symbol matrix transmitted by a transmit end device;
    perform, according to the first modulation symbol matrix, channel estimation on channels corresponding to multiple precoding matrices, to determine channel gains of channels corresponding to the multiple precoding matrices;
    decode the first modulation symbol matrix according to the channel gains of the channels corresponding to the multiple precoding matrices, to obtain log-likelihood values corresponding to combinations of modulation symbols and the multiple precoding matrices; and
    decode a combination having a largest log-likelihood value, of a first modulation symbol and a precoding matrix, to determine a first data bit group.

12. The receive end device according to claim 11, wherein the instructions further comprise instructions to obtain prior information of the first data bit group, and wherein the instructions to decode the combination having the largest log-likelihood value comprises instructions to decode, according to the prior information, the combination having the largest log-likelihood value, of the modulation symbol and the precoding matrix, to determine the first data bit group.

13. The receive end device according to claim 11, wherein the instructions further comprise instructions to receive at least one second modulation symbol matrix transmitted by the transmit end device, and wherein the instructions to perform channel estimation on the channels corresponding to the multiple precoding matrices comprise instructions to perform, according to the first modulation symbol matrix and the at least one second modulation symbol matrix, channel estimation on the channels corresponding to the multiple precoding matrices, to determine the first data bit group and at least one second data bit group.

14. The receive end device according to claim 13, wherein the at least one second modulation symbol comprises at least one non-zero modulation symbol and at least one zero modulation symbol.

15. The receive end device according to claim 11, wherein the first modulation symbol comprises at least one non-zero modulation symbol and at least one zero modulation symbol.

16. The receive end device according to claim 11, wherein the receive end device is a network device.

17. The receive end device according to claim 11, wherein the receive end device is a terminal device.

18. A method comprising:
performing, by a transmit end, bit mapping processing on a first portion of bits of a first data bit group, to generate a first modulation symbol, wherein the first data bit group comprises at least two bits, and wherein the first portion of bits comprises at least one bit;
determining a first precoding matrix from multiple preset precoding matrices according to a second portion of bits of the first data bit group, wherein the first precoding matrix corresponds to at least two antennas of N antennas of the transmit end, wherein N≥2, and wherein the second portion of bits is a bit of the first data bit group other than the first portion of bits;
performing precoding processing on the first modulation symbol according to the first precoding matrix, to obtain a first modulation symbol matrix; and
transmitting the first modulation symbol matrix to a receive end device by the transmit end using at least two antennas of the transmit end.

* * * * *